(12) United States Patent
Back et al.

(10) Patent No.: US 12,462,390 B2
(45) Date of Patent: Nov. 4, 2025

(54) HIERARCHICAL OCCLUSION MODULE AND UNSEEN OBJECT AMODAL INSTANCE SEGMENTATION SYSTEM AND METHOD USING THE SAME

(71) Applicant: GWANGJU INSTITUTE OF SCIENCE AND TECHNOLOGY, Gwangju (KR)

(72) Inventors: Seunghyeok Back, Gwangju (KR); Kyoobin Lee, Gwangju (KR); Joosoon Lee, Gwangju (KR); Taewon Kim, Gwangju (KR); Raeyoung Kang, Gwangju (KR); Sangjun Noh, Gwangju (KR); Seongho Bak, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 502 days.

(21) Appl. No.: 17/951,282

(22) Filed: Sep. 23, 2022

(65) Prior Publication Data
US 2023/0289971 A1    Sep. 14, 2023

(30) Foreign Application Priority Data
Mar. 8, 2022   (KR) .................. 10-2022-0029692

(51) Int. Cl.
*G06T 7/11*    (2017.01)
*G06T 7/50*    (2017.01)
(Continued)

(52) U.S. Cl.
CPC .................. *G06T 7/11* (2017.01); *G06T 7/50* (2017.01); *G06V 10/25* (2022.01); *G06V 10/44* (2022.01);
(Continued)

(58) Field of Classification Search
CPC ... G06T 7/11; G06T 7/50; G06T 2207/10024; G06T 5/20; G06T 7/90;
(Continued)

(56) References Cited

U.S. PATENT DOCUMENTS

| 12,205,338 B2* | 1/2025 | Kim ...................... G06T 7/248 |
| 2021/0150751 A1* | 5/2021 | Liu ...................... G06V 30/274 |

(Continued)

FOREIGN PATENT DOCUMENTS

JP          2022-514917 A      2/2022

OTHER PUBLICATIONS

Follman et al., Learning to see the invisible: End-to-end trainable amodal instance segmentation, IEEE, 2019.*

(Continued)

*Primary Examiner* — John B Strege
(74) *Attorney, Agent, or Firm* — Hauptman Ham, LLP

(57) ABSTRACT

The hierarchical occlusion inference method according to the exemplary embodiment of the present disclosure includes: deriving a bounding box feature of the object instance by receiving a region of interest color-depth FPN feature and the object region of interest feature derived from a cluttered scene image including at least one object instance, deriving a visible feature of the object instance by fusing the object region of interest feature and the bounding box feature, deriving an amodal feature of the object instance by fusing the object region of interest feature, the bounding box feature, and the visible feature, deriving an occlusion feature of the object instance by fusing the object region of interest feature, the bounding box feature, the visible feature, and the amodal feature, and inferring occlusion of an object instance by de-convoluting the occlusion feature of the object instance.

19 Claims, 8 Drawing Sheets

(51) Int. Cl.
  *G06V 10/25* (2022.01)
  *G06V 10/44* (2022.01)
  *G06V 10/56* (2022.01)
  *G06V 10/764* (2022.01)
  *G06V 10/80* (2022.01)
  *G06V 10/82* (2022.01)

(52) U.S. Cl.
  CPC ............ *G06V 10/56* (2022.01); *G06V 10/764* (2022.01); *G06V 10/806* (2022.01); *G06V 10/82* (2022.01); *G06T 2207/10024* (2013.01)

(58) Field of Classification Search
  CPC ...... G06T 2207/20081; G06T 2210/12; G06V 10/25; G06V 10/44; G06V 10/56; G06V 10/764; G06V 10/806; G06V 10/82; G06V 10/26; G06N 20/00
  See application file for complete search history.

(56) References Cited

U.S. PATENT DOCUMENTS

| 2021/0241034 | A1* | 8/2021 | Laradji | G06N 3/08 |
| 2021/0279503 | A1* | 9/2021 | Qi | G06T 7/136 |
| 2021/0407125 | A1 | 12/2021 | Mahendran et al. | |
| 2022/0148284 | A1* | 5/2022 | Kim | G06V 10/25 |

OTHER PUBLICATIONS

[Supportive Materials for Exception to Loss of Novelty] Seunghyeok Back et al., "Unseen Object Amodal Instance Segmentation via Hierarchical Occlusion Modeling," arXiv:2109.11103v1, Sep. 23, 2021, 8 pages.

Office Action dated Sep. 12, 2023, in connection with Japanese Patent Application No. 2022-149728, with English machine translation (8 pages).

Qi et al., "Amodel Instance Segmentation with KINS Dataset," 2019 IEEE/CVF Conference on Computer Vision and Pattern Recognition (CVPR), 2019, pp. 3009-3018.

Office Action dated Jan. 10, 2025 for corresponding Korean Patent Application No. 10-2022-0029692, along with an English machine translation (11 pages).

* cited by examiner

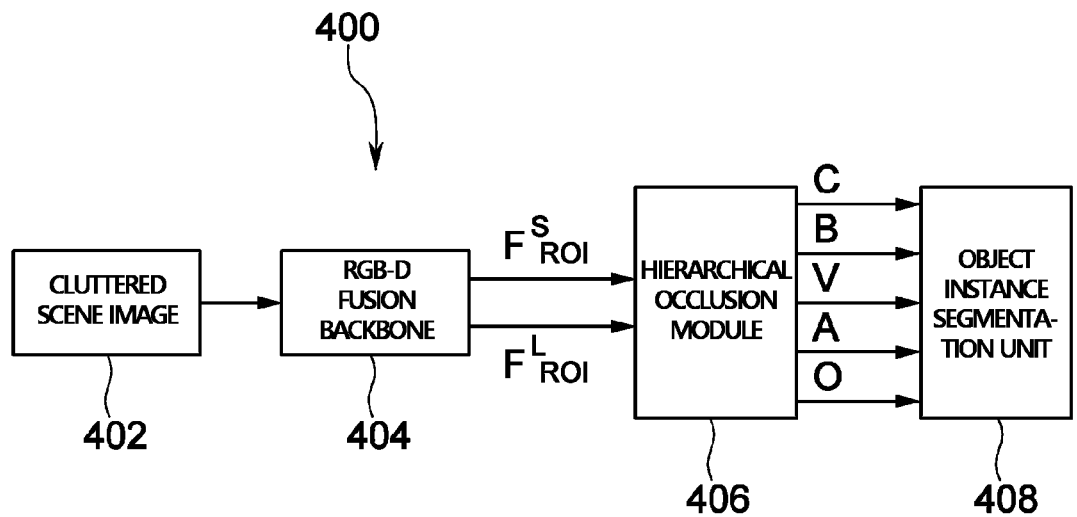
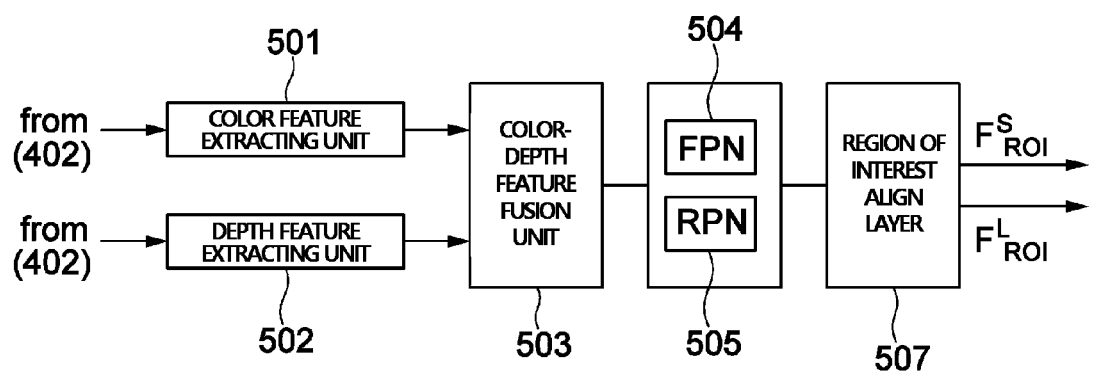

HIERARCHICAL OCCLUSION MODULE AND UNSEEN OBJECT AMODAL INSTANCE SEGMENTATION SYSTEM AND METHOD USING THE SAME

CROSS-REFERENCE TO RELATED APPLICATIONS

This application claims benefit and priority to Korean Patent Application No. 10-2022-0029692, filed on Mar. 8, 2022, with the Korean Intellectual Property Office, the disclosure of which is incorporated herein in its entirety by reference.

TECHNICAL FIELD

The present disclosure relates to a hierarchical occlusion module and an unseen object instance segmentation system and method using the same, and more particularly, to a hierarchical occlusion module which detects whether an arbitrary object instance is occluded in a cluttered scene image and a system and a method of segmenting an unseen object instance using the hierarchical occlusion module.

BACKGROUND

Recently, an object sensing function which is applied to autonomous driving, robotics, and surveillance is attracting attention. In a robot system in an unstructured environment, in a scene image in which a plurality of objects is cluttered, objects (unseen objects) which are hidden behind another object to be invisible need to be detected and segmented for robotic manipulation.

Recently, studies on unseen object instance segmentation (UOIS) have been proposed. Even though according to the unseen object instant segmentation technique of the related art, a concept of object-ness is learned from large-scale synthetic data to segment the unseen object instance by category agnostic instance segmentation, but it is focused on recognizing only a visible area. However, the unseen object instant segmentation (UOIS) study aims to segment a visible region of an arbitrary object instance and it is difficult to accurately detect a cluttered scene, especially, an unseen object which has a complex texture and is occluded by another objects.

In the meantime, when human perceives an occluded object, even though a part of them is not seen, the human may infer the entire structure, and this is called amodal perception. In order to imitate such amodal perception, amodal instance segmentation (AIS) studies have been proposed. The goal of the amodal instance segmentation (AIS) studies is to segment both an amodal mask and a visible mask of each object instance in the scene image. Even though the amodal instance segmentation studies have demonstrated that it is possible to segment an amodal mask of the unseen object from various data sets, only a specific set of trained objects can be detected. That is, it is only possible to recognize a boundary of arbitrary objects to be detected from a set of objects provided with prior knowledge about the object to be detected, but in order to detect a new unseen object, separate training data and model re-education are required.

SUMMARY

The present disclosure has been made in an effort to propose a hierarchical occlusion model which sequentially infers a bounding box, a visible mask, an amodal mask, and occlusion of an arbitrary object instance in a cluttered scene image.

Another object of the present disclosure is to segment an unseen object instance from a cluttered scene image using the hierarchal occlusion model.

The present disclosure may be implemented by various methods including a device (system), a method, a computer program stored in a computer readable media, or a computer readable media in which a computer program is stored.

An exemplary embodiment of the present disclosure provides an occlusion inference method which is a hierarchical occlusion method performed by at least one processor of the computer system, including: acquiring an image feature and an object region of interest feature derived from a cluttered scene image including at least one object instance, by the computer system; deriving a visible feature of the object instance from the image feature and the object region of interest feature, by the computer system; deriving an occlusion including region feature of the object instance by fusing the object region of interest and the visible feature, by the computer system; and deriving an occlusion including region mask of the object instance from the occlusion including region feature, by the computer system.

Desirably, the deriving of an occlusion including region feature of the object instance by fusing the object region of interest and the visible feature, by the computer system, includes: fusing the object region of interest and the visible feature in a hierarchical fusion module or a fully connected layer including a convolution layer, by the computer system.

To be more desirable, the deriving of an occlusion including region mask of the object instance from the occlusion including region feature, by the computer system, includes: extracting an occlusion including region mask of the object instance by deconvoluting or computing the occlusion including region feature of the object instance in a fully connected layer, by the computer system.

Another exemplary embodiment of the present disclosure provides an occlusion inference method which is a hierarchical occlusion method performed by at least one processor of the computer system, including: acquiring an image feature and an object region of interest feature derived from a cluttered scene image including at least one object instance, by the computer system; deriving a visible feature of the object instance and an occlusion including region feature from the image feature and the object region of interest feature, by the computer system; deriving an occlusion feature of the object instance by fusing the object region of interest feature, the visible feature, and the occlusion including region feature, by the computer system; and inferring occlusion of the object instance from the occlusion feature of the object instance, by the computer system.

Desirably, the deriving of an occlusion feature of the object instance by fusing the object region of interest feature, the visible feature, and the occlusion including region feature, by the computer system, includes: fusing the object region of interest feature, the visible feature, and the occlusion including region feature in a hierarchical fusion module or a fully connected layer including a convolution layer, by the computer system.

To be more desirable, the inferring of occlusion of the object instance from the occlusion feature of the object instance, by the computer system, includes: inferring occlusion of the object instance by deconvoluting or computing the occlusion feature of the object instance in a fully connected layer, by the computer system.

To be more desirable, the image feature includes at least one of a color feature, a depth feature, and a color-depth fusion feature.

To be more desirable, the occlusion including region feature includes at least one of an amodal feature and an invisible feature.

To be more desirable, the occlusion inference method may further include: deriving a bounding box feature of the object instance by receiving a region of interest color-depth FPN feature and the object region of interest feature derived from a cluttered scene image including at least one object instance, by the computer system; and inferring occlusion of the object instance by deconvoluting or computing the occlusion feature of the object instance in a fully connected layer, by the computer system.

To be more desirable, the occlusion inference method may further include: extracting a class and a bounding box of the object instance based on the bounding box feature of the object instance, by the computer system.

To be more desirable, the extracting of a class and a bounding box of the object instance based on the bounding box feature of the object instance, by the computer system, includes extracting the class and the bounding box by supplying the bounding box feature to a fully connected layer, by the computer system.

To be more desirable, the deriving of a visible feature of the object instance by fusing the object region of interest feature and the bounding box feature, by the computer system, includes fusing the object region of interest feature and the bounding box feature in a hierarchical fusion module or a fully connected layer including a convolution layer, by the computer system.

To be more desirable, the occlusion inference method may further include: extracting a visible mask of the object instance from the visible feature of the object instance, by the computer system.

To be more desirable, the extracting of a visible mask of the object instance from the visible feature of the object instance, by the computer system, includes: extracting a visible mask of the object instance by deconvoluting or computing the visible feature of the object instance in a fully connected layer, by the computer system.

Another exemplary embodiment of the present disclosure provides a system including: a processor; and a computer readable medium including a command which allows the processor to execute a hierarchical occlusion module and the hierarchical occlusion module includes: a unit which acquires an image feature and an object region of interest feature derived from a cluttered scene image including at least one object instance; a unit which derives a visible feature of the object instance from the image feature and the object region of interest feature; a unit which derives an occlusion including region feature of the object instance by fusing the object region of interest feature and the visible feature; and a unit which derives an occlusion including region mask of the object instance from the occlusion including region feature.

Desirably, the unit which derives an occlusion including region feature of the object instance by fusing the object region of interest feature and the visible feature includes a unit which fuses the object region of interest feature and the visible feature in a hierarchical fusion module or a fully connected layer including a convolution layer.

To be more desirable, the unit which derives an occlusion including region mask of the object instance from the occlusion including region feature includes: a unit which extracts an occlusion including region mask of the object instance by deconvoluting or computing the occlusion including region feature of the object instance in a fully connected layer.

Another exemplary embodiment of the present disclosure provides a system including: a processor; and a computer readable medium including a command which allows the processor to execute a hierarchical occlusion module, the hierarchical occlusion module includes: a unit which acquires an image feature and an object region of interest feature derived from a cluttered scene image including at least one object instance; a unit which derives a visible feature and an occlusion including region feature of the object instance from the image feature and the object region of interest feature; a unit which derives an occlusion feature of the object instance by fusing the object region of interest feature, the visible feature, and the occlusion including region feature; and a unit which infers the occlusion of the object instance from an occlusion feature of the object instance.

Desirably, the unit which derives an occlusion feature of the object instance by fusing the object region of interest feature, the visible feature, and the occlusion including region feature includes: a unit which fuses the object region of interest, the visible feature, and the occlusion including region feature in a hierarchical fusion module or a fully connected layer including a convolution layer.

To be more desirable, the unit which infers the occlusion of the object instance from an occlusion feature of the object instance includes: a unit which infers occlusion of the object instance by deconvoluting or computing the occlusion feature of the object instance in a fully connected layer.

To be more desirable, the image feature includes at least one of a color feature, a depth feature, and a color-depth fusion feature.

To be more desirable, the occlusion including region feature includes at least one of an amodal feature and an invisible feature.

To be more desirable, the system further includes: a unit which derives a bounding box feature of the object instance by receiving a region of interest color-depth FPN feature and the object region of interest feature derived from a cluttered scene image including at least one object instance; a unit which derives a visible feature of the object instance by fusing the object region of interest feature and the bounding box feature.

To be more desirable, the system further includes: a unit which extracts a class and a bounding box of the object instance based on the bounding box feature of the object instance.

To be more desirable, the unit which extracts a class and a bounding box of the object instance based on the bounding box feature of the object instance includes: a unit which extracts the class and the bounding box by supplying the bounding box feature to a fully connected layer.

To be more desirable, the unit which derives a visible feature of the object instance by fusing the object region of interest feature and the bounding box feature includes: a unit which fuses the object region of interest feature and the bounding box feature in a hierarchical fusion module or a fully connected layer including a convolution layer.

To be more desirable, the system further includes: a unit which extracts a visible mask of the object mask from the visible feature of the object instance.

To be more desirable, the unit which extracts a visible mask of the object mask from the visible feature of the object instance includes: a unit which extracts the visible mask of the object instance by deconvoluting or computing the visible feature of the object instance with a fully connected layer.

Another exemplary embodiment of the present disclosure provides an unseen object instance segmentation method which is an unseen object instance amodal segmentation method performed by at least one processor of a computer system, including: deriving and fusing a color feature and a depth feature by receiving a cluttered scene image including at least one invisible object instance to generate a color-depth fusion feature, by the computer system; extracting a color-depth FPN feature by applying the color-depth fusion feature to a feature pyramid network and extracting an object region of interest by applying the color-depth fusion feature to a region proposal network, by the computer system; extracting a region of interest color-depth FPN feature and an object region of interest feature from the color-depth FPN feature and the object region of interest feature, by the computer system; deriving a bounding box feature and a bounding box of the invisible object instance from the region of interest color-depth FPN feature and an object region of interest feature, by the computer system; deriving a visible feature and a visible mask of the invisible object instance by fusing the object region of interest feature and the bounding box feature, by the computer system; deriving an amodal feature and an amodal mask of the invisible object instance by fusing the object region of interest feature, the bounding box feature, and the visible feature, by the computer system; deriving an occlusion feature and occlusion of the invisible object instance by fusing the object region of interest feature, the bounding box feature, the visible feature, and the amodal feature, by the computer system; and segmenting the invisible object instance based on the bounding box, the visible mask, the amodal mask, and occlusion of the invisible object instance, by the computer system.

According to an aspect of the present disclosure, the deriving of a bounding box feature and a bounding box of the invisible object instance from the region of interest color-depth FPN feature and an object region of interest feature, by the computer system, includes: extracting the bounding box of the invisible object instance by supplying the bounding box feature to a fully connected layer, by the computer system.

According to an aspect of the present disclosure, the deriving of a visible feature and a visible mask of the invisible object instance by fusing the object region of interest feature and the bounding box feature, by the computer system, includes: deriving a visible feature of the invisible object instance by fusing the object region of interest feature and the bounding box feature in a hierarchical fusion module including a convolution layer, by the computer system; and extracting a visible mask of the invisible object instance by deconvoluting the visible feature of the invisible object instance, by the computer system.

According to an aspect of the present disclosure, the deriving of an amodal feature and an amodal mask of the invisible object instance by fusing the object region of interest feature, the bounding box feature, and the visible feature, by the computer system, includes: deriving an amodal feature of the invisible object instance by fusing the object region of interest feature, the bounding box feature, and the visible feature in a hierarchical fusion module including a convolution layer, by the computer system; and extracting an amodal mask of the invisible object instance by deconvoluting the amodal feature of the invisible object instance, by the computer system.

According to an aspect of the present disclosure, the deriving of an occlusion feature and occlusion of the invisible object instance by fusing the object region of interest feature, the bounding box feature, the visible feature, and the amodal feature, by the computer system, includes: deriving an occlusion feature of the invisible object instance by fusing the object region of interest feature, the bounding box feature, the visible feature, and the amodal feature in a hierarchical fusion module including a convolution layer, by the computer system; and inferring occlusion of the invisible object instance by deconvoluting the occlusion feature of the invisible object instance, by the computer system.

Another exemplary embodiment of the present disclosure provides an unseen object instance segmentation system including: a processor; and a computer readable medium including a command which allows the processor to execute an invisible object amodal instance segmentation network. The unseen object amodal instance segmentation network derives and fuses a color feature and a depth feature by receiving a cluttered scene image including at least one invisible object instance to generate a color-depth fusion feature, extracts a color-depth FPN feature by applying the color-depth fusion feature to a feature pyramid network and extracting an object region of interest by applying the color-depth fusion feature to a region proposal network, extracts a region of interest color-depth FPN feature and an object region of interest feature from the color-depth FPN feature and the object region of interest feature, derives a bounding box feature and a bounding box of the invisible object instance from the region of interest color-depth FPN feature and an object region of interest feature, derives a visible feature and a visible mask of the invisible object instance by fusing the object region of interest feature and the bounding box feature, derives an amodal feature and an amodal mask of the invisible object instance by fusing the object region of interest feature, the bounding box feature, and the visible feature, derives an occlusion feature and occlusion of the invisible object instance by fusing the object region of interest feature, the bounding box feature, the visible feature, and the amodal feature, by the computer system, and segments the invisible object instance based on the bounding box, the visible mask, the amodal mask, and occlusion of the invisible object instance.

According to an aspect of the present disclosure, the unseen object amodal instance segmentation network extracts a bounding box of the invisible object instance by supplying the bounding box feature to a fully connected layer.

According to an aspect of the present disclosure, the unseen object amodal instance segmentation network derives a visible feature of the invisible object instance by fusing the object region of interest feature and the bounding box feature in a hierarchical fusion module including a convolution layer, by the computer system and extracts a visible mask of the invisible object instance by deconvoluting a visible feature of the invisible object instance.

According to an aspect of the present disclosure, the unseen object amodal instance segmentation network derives an amodal feature of the invisible object instance by fusing the object region of interest feature, the bounding box feature, and the visible feature in a hierarchical fusion module including a convolution layer, and extracts an amodal mask of the invisible object instance by deconvoluting the amodal feature of the invisible object instance.

According to an aspect of the present disclosure, the unseen object amodal instance segmentation network derives an occlusion feature of the invisible object instance by fusing the object region of interest feature, the bounding box feature, the visible feature, and the amodal feature in a hierarchical fusion module including a convolution layer, and infers occlusion of the invisible object instance by deconvoluting an occlusion feature of the invisible object instance.

According to an aspect of the present disclosure, the unseen object amodal instance segmentation network further includes: a machine learning module which trains at least one model parameter of the invisible object instance amodal segmentation network to segment an invisible object instance from at least one cluttered scene image.

According to the present disclosure, the following effects are obtained.

According to the present disclosure, a bounding box, a visible mask, an amodal mask, and occlusion of an arbitrary object instance whose category is not classified are hierarchically detected from a cluttered scene image and all features derived from a previous class are fused to accurately infer the occlusion of the arbitrary object instance.

According to the present disclosure, occlusion of the object instance is inferred based on amodal recognition using an occlusion inference model and an unseen object is detected based thereon to increase the accuracy and the speed of the object recognition.

According to the present disclosure, visible segmentation, amodal segmentation, and inference of occlusion are commonly performed on a plurality of unseen object instances from a cluttered scene image.

According to the present disclosure, the need for the task-specific data set and model retraining is reduced by learning how to segment an amodal mask whose category is not distinguished.

The present disclosure may be extended to various amodal robot manipulations by reducing a computation and a cost required to detect a plurality of unseen object instances whose category is not distinguished in a cluttered scene image.

The effects of the present disclosure are not limited to the above-mentioned effects and those of ordinary skill in the art to which the present disclosure pertains (referred to as those skilled in the art) may clearly understand other effects which have not been mentioned from the description of the claims.

BRIEF DESCRIPTION OF THE DRAWINGS

Exemplary embodiments of the present disclosure will be described below with reference to accompanying drawings and like reference numbers denote like elements, but are not limited thereto.

FIG. 4 is a diagram illustrating a unseen object amodal instance segmentation network according to an exemplary embodiment of the present disclosure;

FIG. 5 is a diagram illustrating an example of a color-depth fusion backbone according to an exemplary embodiment of the present disclosure;

DETAILED DESCRIPTION

Figure 1:
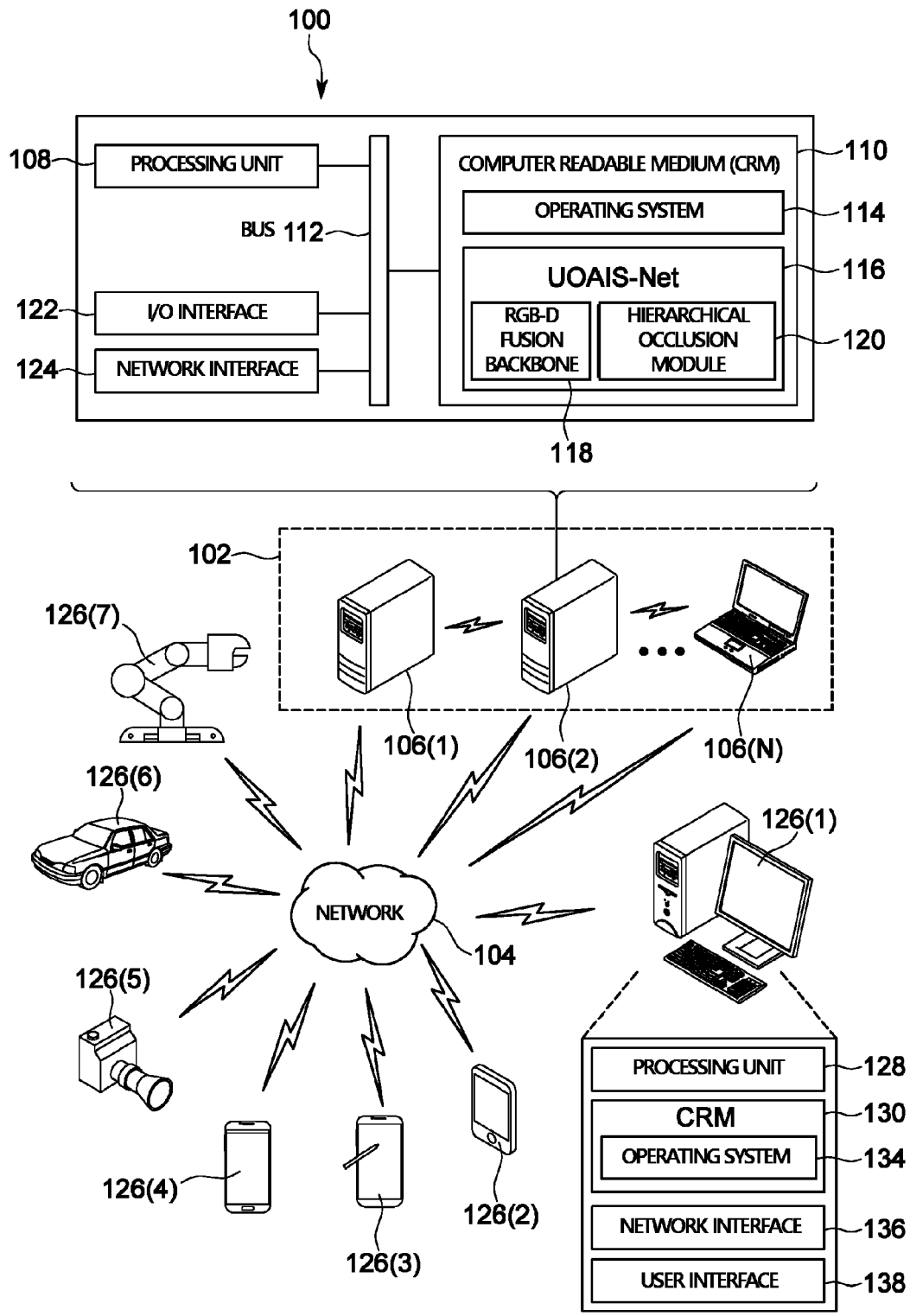
FIG. 1 illustrates an exemplary environment in which an unseen object instance segmentation system of the present disclosure operates.

Specific contents for implementing the present disclosure will be described in detail with reference to the following accompanying drawings. However, in the following description, if there is a risk of unnecessarily obscuring the gist of the present disclosure, detailed description of well-known functions or configurations will be omitted.

In the accompanying drawings, same or corresponding components are denoted by the same reference numerals. Further, in the following description of the exemplary embodiments, redundant description for the same or corresponding component may be omitted. However, even though the description of the component is omitted, it is not intended that such a component is not included in any embodiment.

Advantages and characteristics of the exemplary embodiment disclosed in the present specification and a method for achieving the advantages and characteristics will be clear by referring to exemplary embodiments to be described below in detail together with the accompanying drawings. The present disclosure is not limited to the exemplary embodiments to be disclosed below, but may be implemented in various different forms and the exemplary embodiments are merely provided to fully inform those skilled in the art about the scope of the present disclosure.

Unless otherwise defined, all terms (including technical and scientific terms) used in the present specification may be used as the meaning which may be commonly understood by the person with ordinary skill in the art, to which the present disclosure belongs. It will be further understood that terms defined in commonly used dictionaries should not be interpreted to have an idealistic or excessively formalistic meaning unless expressly and specifically defined.

For example, the term "technique" may refer to a system, method, computer readable instruction, module, algorithm, hardware logic, and/or operation as permitted by the context described above and throughout a document.

The terms used in the present specification will be described briefly and the disclosed exemplary embodiments will be described specifically. Terms used in the specification are selected from general terminologies which are currently and widely used as much as possible while considering a function in the present disclosure, but the terms may vary in accordance with the intention of those skilled in the art, the precedents, or appearance of new technology. Further, in particular cases, the terms are arbitrarily selected by an applicant and in this case, the meaning thereof may be described in a corresponding section of the description of the disclosure. Therefore, the term used in the specification needs to be defined based on a substantial meaning of the terminology and the specification rather than a simple title of the terminology.

Unless the context clearly specifies a singular form, the singular form includes plural forms. Unless the context clearly specifies the plural form, the plural form includes a singular form. In the specification, unless explicitly described to the contrary, the word "comprise" and variations such as "comprises" or "comprising", will be understood to imply the inclusion of stated elements but not the exclusion of any other elements.

In the present disclosure, even though terms such as 'comprise', 'comprising', etc. may indicate that features, steps, operations, elements and/or components are present, such terms do not exclude that one or more other functions, steps, operations, elements, components, and/or a combination thereof are added.

In the present disclosure, when a particular component is referred to as 'coupled', 'combined', 'connected', 'associated', or 'reacted' to any other component, the particular component may be directly coupled, combined, connected and/or associated or reacted to the other component, but is not limited thereto. For example, there may be one or more intermediate component between the particular component and the other component. Further, in the present disclosure the term "and/or" include each of one or more listed items, or a combination of at least some of one or more items.

In the present disclosure, the terms "first", "second", and etc. are used to distinguish one component from the other component, but the above-described components are not limited by this term. For example, the "first component" may be used to refer an identical or similar element to the "second component".

In the present disclosure, "the cluttered scene image" is a scene image including a plurality of objects and includes an object occluded by the other object. The cluttered scene image may be photorealistic synthetic data set which is identical to a photograph or may be a real image captured by an actual camera.

In the present disclosure, "color-depth (RGB-D) fusion backbone" is an image feature to detect a foreground object instance from the cluttered scene image and generates a color feature, a depth feature, and a color-depth fusion feature. The RGB-D fusion backbone extracts a color feature and a depth feature and fuses the extracted color feature and depth feature to generate a color-depth fusion feature. The color feature, the depth feature, and the color-depth fusion feature may be used as image features for detecting a foreground object instance from the cluttered scene image.

In the present disclosure, the RGB-D fusion backbone includes a feature pyramid network (FPN), a region proposal network (RPN), and a region of interest (ROI) align layer. The feature pyramid network (FPN) extracts a color-depth FPN feature from the color-depth fusion feature and the color-depth FPN feature may be used as an image feature to detect a foreground object instance from the cluttered scene image. The color-depth FPN feature may be a result calculated by applying the color-depth fusion feature to the feature pyramid network. The region proposal network (RPN) may extract an object region of interest (RoI) from the color-depth fusion feature. Here, the RoI of the object may be a result calculated by applying the color-depth fusion feature to the region proposal network (RPN). The RoI align layer extracts a region of interest color-depth FPN feature $F_{RoI}^{S}$ and an object region of interest feature $F_{RoI}^{L}$ from an arbitrary object region of interest (RoI) based on the color-depth FPN feature and provides the region of interest color-depth FPN feature $F_{RoI}^{S}$ and the object region of interest feature $F_{RoI}^{L}$ to the hierarchical occlusion model.

In the present disclosure, the "hierarchical occlusion model (HOM)" refers to a model which hierarchically and sequentially performs at least two of bounding box, visible mask, invisible mask, amodal mask, and occlusion inference on an arbitrary object instance based on an image feature derived from a cluttered scene image. The image feature used for the hierarchical occlusion model of the present disclosure may be a color feature, a depth feature, a color-depth fusion feature, and a color-depth FPN feature provided from the RGB-D fusion backbone.

The hierarchical occlusion model may be designed to infer a bounding box of an object region of interest (ROI) from the cluttered scene image first, sequentially predict at least two of the visible feature, amodal feature, the invisible feature, and the occlusion based on the inferred bonding box of the object region of interest to infer at least two of the visible mask, the amodal mask, the invisible mask, and the occlusion.

A hierarchical occlusion module of the present disclosure may refer to a means of implementing the hierarchical occlusion model. The hierarchical occlusion module of the present disclosure may be configured by a bounding box feature extracting unit, a bounding box dividing unit, a visible mask dividing unit, an amodal mask dividing unit, and an occlusion inference dividing unit. Instead of the amodal mask dividing unit, an invisible mask dividing unit may be included.

The bounding box feature extracting unit may extract a bounding box feature $F_B$ of an arbitrary object instance based on the region of interest color-depth FPN feature $F_{RoI}^{S}$ and the object region of interest feature $F_{RoI}^{L}$. The bounding box dividing unit may extract a class and a bounding box of an arbitrary object instance based on the bounding box feature $F_B$. The bounding box feature $F_B$ extracted by the bounding box feature extracting unit may be provided to the visible mask dividing unit, the amodal mask dividing unit, and the occlusion inference dividing unit.

The visible mask dividing unit may extract a visible feature $F_V$ from the bounding box feature $F_B$ and the object region of interest feature $F_{RoI}^{L}$.

The amodal mask dividing unit may fuse the bounding box feature $F_B$, the object region of interest feature $F_{RoI}^{L}$, and the visible feature $F_V$ to extract an amodal feature $F_A$.

The invisible mask dividing unit may fuse the bounding box feature $F_B$, the object region of interest feature $F_{RoI}^{L}$, and the visible feature $F_V$ to extract an invisible feature $F_{IV}$.

The occlusion inference dividing unit may fuse the bounding box feature $F_B$, the object region of interest feature $F_{RoI}^{L}$, the visible feature $F_V$, and the amodal feature $F_A$ to extract an occlusion feature $F_O$.

Each of the visible mask dividing unit, the amodal mask dividing unit, and the occlusion inference dividing unit may include a hierarchical fusion (HF) module including a convolution layer or a fully connected layer and each of the hierarchical fusion module or the fully connected layer is implemented by a neural network to fuse features extracted from the previous layer and extract a feature of a corresponding layer. For example, in the hierarchical fusion module or the fully connected layer of the amodal mask dividing unit, the visible feature is fused with the other features to extract an amodal feature and in the hierarchical fusion module or the fully connected layer of the occlusion inference dividing unit, the visible feature and the amodal feature are fused with the other features to extract an occlusion feature.

In the present disclosure, a "unseen object amodal instance segment (UOAIS) network (UOAIS-net) may be a system which combines an RGB-D fusion backbone and a hierarchical occlusion model to extract a feature from a cluttered image and extract and predict the bounding box, the visible mask, the amodal mask, the invisible mask, and the occlusion based on the extracted feature. Instead of the RGB-D fusion backbone, a color feature extracting unit, and a depth feature extracting unit may be combined with the hierarchical occlusion model.

In the present disclosure, the "bounding box" may be a closed curve extracted along a boundary of a foreground object instance from the cluttered scene image. In the present disclosure, a region proposal network RPN may propose an object region of interest ROI as a latent object position and the region of interest align layer extracts a region of interest color-depth FPN feature $F_{RoI}^S$ to provide $F_{RoI}^S$ to the bounding box dividing unit. The bounding box dividing unit may be configured by two fully connected layers and the boundary box feature $F_B$ is supplied to one fully connected layer to extract a class and the boundary box feature $F_B$ is supplied to the other fully connected layer to extract a bounding box for an arbitrary foreground object instance.

In the present disclosure, the "class" may be information for distinguishing whether the region of interest is a foreground or a background. In the present disclosure, it is set to detect all foreground object instances. In the present disclosure, a "visible mask" refers to a region which is visible from the object instance. In the present disclosure, an "invisible mask" refers to a region which is invisible from the object instance, that is, a region occluded by another object. In the present disclosure, an "amodal mask" refers to a region in which a visible mask and an invisible mask of the object instance are combined. That is, the invisible mask and the amodal mask correspond to an occlusion including region mask. In the present disclosure, after segmenting the visible mask of the object instance, the occlusion including region mask is inferred based on the divided visible mask. Here, the occlusion including region mask includes an amodal mask and an invisible mask. In the present disclosure, the "occlusion" may refer to whether there is an occluded region in which an arbitrary object instance is occluded by the other object. In the present disclosure, the occlusion is defined by a ratio of a visible mask and an amodal mask or defined by the presence of the invisible mask. That is, when the visible mask and the amodal mask are the same, it is defined that the corresponding object instance is not occluded, when the amodal mask is larger than the visible mask, it is defined that the corresponding object instance is occluded, and when there is an invisible mask, it is defined that the corresponding object instance is occluded. In the present disclosure, after segmenting the visible mask and the occlusion including region mask, the occlusion is inferred.

The exemplary embodiment described in the present disclosure trains the unseen object amodal instance segmentation network (UOAIS-Net) with a training image to quickly and accurately infer the occlusion in the cluttered scene image and applies the machine learning. The machine learning may be a multiple-stage machine learning process or a single stage learning process.

An operating system described below configures one exemplary embodiment, but the claim is not limited to arbitrary one specific operating environment. The operating system may also be used in the other environment without departing from the technical spirit and scope of the claimed subject matter.

FIG. 1 illustrates an exemplary environment 100 in which an unseen object instance segmentation system of the present disclosure is operable. In some examples, various devices and/or components of the environment 100 may include a distributed computer resource 102 which is communicable to each other and to an external device via one or more networks 104.

For example, the network 104 may include a public network such as Internet, a private network such as institutional and/or private intranet, or some combination of the private and public networks. The network 104 may include any type of wired and/or wireless network including, but not limited to, a local area network (LAN), a wide area network (WAN), a satellite network, a cable network, a Wi-Fi network, and a WiMax network and may further include a mobile communication network (for example, 3G, 4G, 5G, etc.) or any combination thereof. The network 104 may utilize communication protocols, including packet-based and/or datagram-based protocols, such as internet protocol (IP), transmission control protocol (TCP), user datagram protocol (UDP), or other types of protocols. Moreover, the network 104 may include a large number of devices that facilitate network communications or form a hardware foundation for the network, such as switches, routers, gateways, access points, firewalls, base stations, repeaters, or backbone devices.

In some exemplary embodiments, the network 104 may further include devices which enable connection to a wireless network, such as a wireless access point WAP. The exemplary embodiments according to the present disclosure may include the WAP which supports institute of electrical and electronics engineers (IEEE) 802.11 standards (for example, 802.11g or 802.11n) to support the connection via the WAP which transmits and receives data through various electromagnetic frequencies (for example, radio frequencies).

In the various exemplary embodiments, the distributed computer resource 102 includes devices 106(1) to 106(N). The exemplary embodiment of the present disclosure may support a scenario that the device 106 includes one or more computer devices to operate in a cluster or other grouped configuration to share resources, distribute loads, increase the performance, or achieve other purposes. The device 106 may fall into various categories, such as conventional server type devices, desktop computer type devices, mobile devices, special purpose type devices, embedded type devices, and/or wearable type devices. Accordingly, even though it is described as a desktop or a laptop computer, the device 106 may include various types of devices, but is not limited to a specific type of device. The device 106 may be an integrated component to be included in a desktop computer, a server computer, a web server computer, a personal computer, a mobile computer, a laptop computer, a tablet computer, a wearable computer, an implantable computer, a communication device, an automotive computer, a network enabled television, a thin client, a terminal, a PDA, a game console, a gaming device, a workstation, a media player, a personal video recorder (PVR), a set-top box, a camera, and a computer device.

The device 106 may include any type of computer device having one or more processing units 108 operatively connected to a computer readable media (CRM) 110 via a bus 112, and in some cases, it may include one or more of them. Such a bus 112 may include a system bus, a data bus, an address bus, a PCI bus, a mini PCI bus, and various local, peripheral device and/or independent buses.

Executable instructions stored in the CRM 110 include, for example, the operating system 114, the unseen object amodal instance segmentation network (UOAIS Net) 116, the color-depth fusion backbone 118, the hierarchical occlusion module (HOM) 120 and other modules, programs or applications loadable and executable by the processing unit 108. Additionally, what is functionally described herein may be performed at least partially by one or more hardware logic components, such as accelerators. For example, exemplary types of hardware logic components that may be used include field-programmable gate arrays (FPGAs), application-specific integrated circuits (ASICs), application-specific standard products (APS), system-on-a-chip systems (SOCs), and complex programmable logic devices (CPLDs).

The device 106 includes one or more input/output (I/O) interfaces 122 to be communicable with peripheral input devices (for example, a keyboard, a mouse, a pen, a game controller, a voice input device, a touch input device, and a gesture input device and/or peripheral output devices (for example, a display, and a printer). For the sake of convenience, components other than the illustrated device 106 are omitted.

The device 106 may include one or more input/output (I/O) interfaces 122 to allow the device 106 to be communicable with the other network device such as a consumer computer device 126 which allows a consumer to input, (for example, a query image or a request image). The input/output (I/O) interface 122 may include one or more network interface controllers NIC to transmit and receive the communication through a network or another type of transceiver device.

The other device related to the unseen object instance segmentation optimization may include consumer computer devices 126(1) to 126(7). The consumer computer device 126 may fall into various categories, such as consumer devices, desktop computer type devices, mobile devices, special purpose devices, embedded devices, and/or wearable devices. Accordingly, even though the consumer computer device 126 is illustrated as a mobile computer device having computer resources less than the device 106, the consumer computer device 126 may include various device types, but is not limited to an arbitrary specific type of device.

The consumer computer device 126 may include a server computer or a blade server, such as a web server, an app server, or other computing engine, or a network connection storage device 126(1), a satellite based navigation system device 126(2) (for example, graphically represented by a PDA) including a laptop computer, a thin client, a terminal, or other mobile computer, a personal data assistant (PDA), a smart watch, a wearable computer such as a biometric or medical sensor, an implanted computer device such as a biometric or medical sensor, a computer navigation consumer computer device, and a global positioning system (GPS) device, a tablet computer or a tablet hybrid computer 126(3), a smart phone, a mobile phone, a mobile tablet hybrid device, or other communication device 126(4), a portable or console based gaming device or other entertainment device such as a network capable television, a set top box, a media player, a camera graphically displayed camera or a personal video recorder (PVR) 126(5), an automotive computer or an automotive security system 126(6) such as a vehicle control system, and a mechanical robotic device 126(7) which has an appearance and a function similar to a human or a human arm to be operated by a computer program and automatically perform a series of complex tasks, or a computer device, equipment, or other computer device which is configured to perform the unseen object instance segmentation optimization as described in the present specification.

The consumer computer device 126 may provide synthetic data of the cluttered scene image to train the unseen object amodal instance segmentation network to the device 106 or provide a real cluttered scene image to test the unseen object amodal instance segmentation network to the device 106. To this end, the consumer computer device 126 desirably includes a camera device.

The consumer computer device 126 may be an arbitrary type of computer device having one or more processing units 128 operably connected to a computer readable medium CRM 130 via buses which may include more system buses, data buses, address buses, PCI buses, mini PCI buses, and various local, peripheral devices and/or independent buses.

The CRMs 110 and 130 described in the present disclosure include computer storage media and/or communication media. The computer storage media includes a tangible storage unit, attachable and detachable computer storage media, such as a volatile memory or a non-volatile memory and/or other persistent and/or auxiliary computer storage media which are implemented by an arbitrary method or technique for storing information, such as a computer readable command, a data structure, a program module, or other data.

The computer storage media may be an RAM, a static RAM (SRAM), a dynamic RAM (DRAM), a phase change memory (PRAM), a read only memory (ROM), an erasable programmable read only memory (EPROM), an electrically erasable programmable read only memory (EEPROM), a flash memory, a DVD, an optical storage medium, a magnetic cassette, a magnetic tape, or a solid-state memory (SSD).

Unlike the computer storage media, the communication media may implement other data by a computer readable command, a data structure, a program module, or a modulated data signal such as a carrier wave, or other transmission mechanism. In the present specification, the computer storage media do not include a communication medium.

The executable command stored in the CRM 130 may include other modules, programs, or applications which are loaded and executed by the operating system 134 and the processing unit 128. Additionally or alternatively, what is functionally described herein may be performed at least partially by one or more hardware logic components, such as accelerators. For example, exemplary types of hardware logic components that may be used include field-programmable gate arrays (FPGA), application-specific integrated circuits (ASIC), application-specific standard products (ASSP), system-on-a-chip systems (SOC), and complex programmable logic devices (CPLD). For example, the accelerator may be a hybrid device of XILINX or ALTERA including a CPU embedded in an FPGA fabric.

The consumer computer device 126 includes one or more input/output (I/O) interfaces including one or more network interfaces 136 and user interfaces 138 to enable the communication with the other consumer computer device 126 or other network device such as the device 106 via the network 104. The network interface 136 may include one or more network interface controllers NIC to transmit and receive the communication through a network or another type of transceiver device.

The consumer computer device 126 may include a user interface 138 to receive a user input such as the cluttered scene image and a response to the input.

Figure 2:
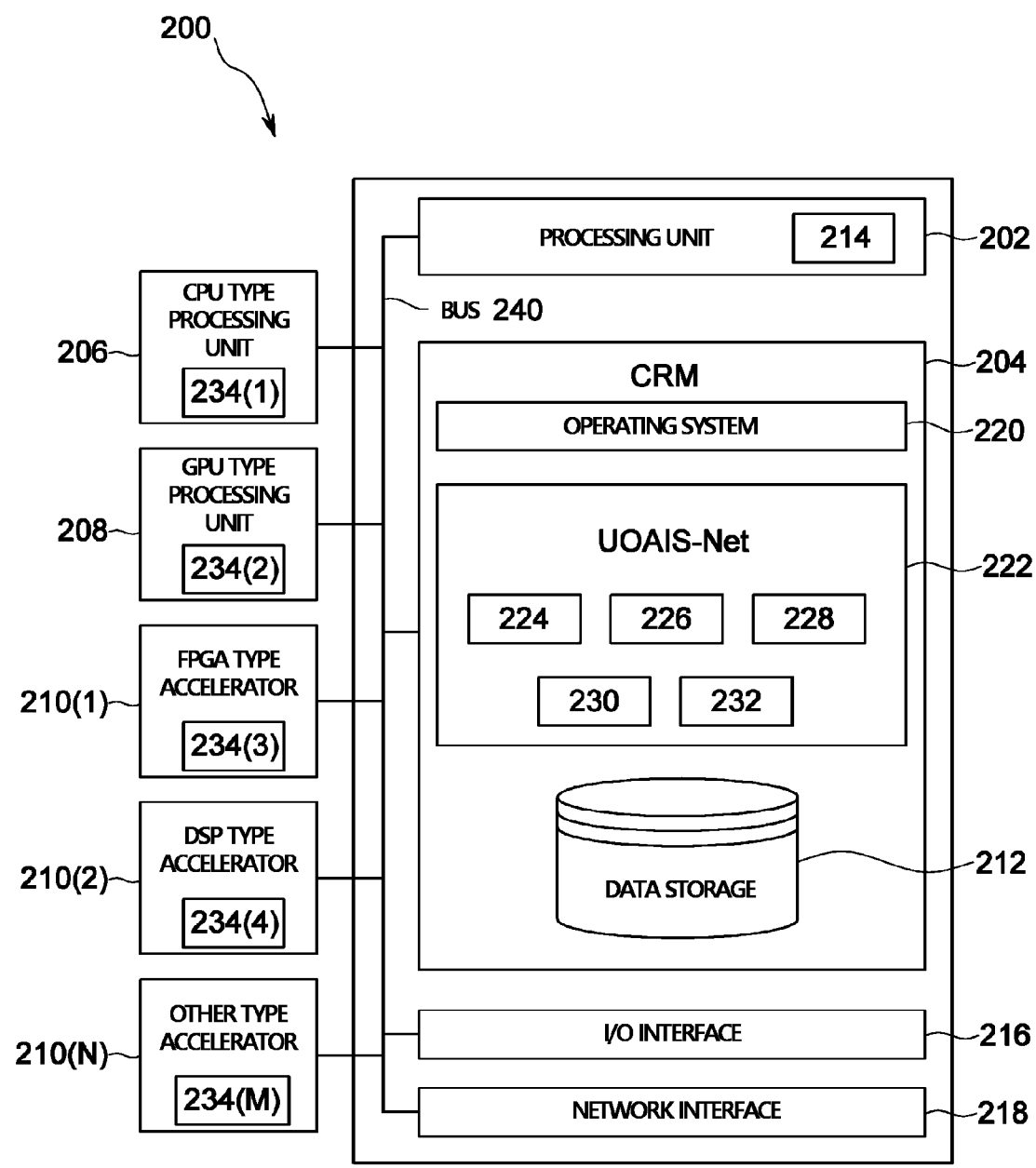
FIG. 2 is a block diagram illustrating an exemplary computer device configured to participate in a unseen object instance segmentation system.

FIG. 2 is a block diagram illustrating an exemplary computer device 200 configured to participate in a unseen object instance segmentation system. In some exemplary embodiments, the computer device 200 may be one computer device which is a distributed computer resource, like the device 106 of FIG. 1. A processing unit 202 of the device 200 may include a processing unit 108 which indicates a CPU type processing unit, a GPU type processing unit, a field programmable gate array (FPGA), a digital signal processor (DSP) or other hardware logic component which may be driven by the CPU. For example, the hardware logic component may include an application-specific integrated circuits (ASIC), an application-specific standard product (ASP), a system on-a-chip (SOC) system, and a complex programmable logic device (CPLD).

In some exemplary embodiments, the CRM 204 indicates a CRM 110 and may store a command executable by the processing unit 202 which is integrated in the device 200 as described above. The CRM 204 may store a command which is executable by an external processing unit, such as an external CPU type processing unit 206 or an external GPU type processing unit 208, and/or an external accelerator 210 such as an FPGA type accelerator 210(1), a DSP type accelerator 210(2), or other accelerator 210(N).

In the exemplary embodiment, the CRM 204 also includes a data storage 212. In some exemplary embodiment, the data storage 212 may include a data storage such as a database, a data warehouse, or other type of structured or unstructured data storage. In some exemplary embodiment, the data storage 212 includes corpus and/or relational databases having one or more tables which enable data access, such as a web table including one or more hypertext mark-up language (HTML) table, a resource description framework (RDF) table, a web ontology language (WOL) table, and/or an extensible markup language (XML) table, indexes, and storage procedures. For example, the data storage 212 may store data and/or a command for a process, an application, a component and/or an operation of a module which is stored in the CRM 204 and is executed by the processing unit 202.

The device 200 may further include one or more input/output (I/O) interface 216 and the input/output (I/O) interface 216 may be an I/O interface 216 which allows the device 200 to communicate with an input/output device, such as a user input device including a peripheral input device (for example, a keyboard, a mouse, a pen, a game controller, a voice input device, a touch input device, a gesture input device, or a camera) and a peripheral output device (for example, a display or a printer). Additionally, in the device 200, a network interface 218 which may be the network interface 122 may indicate a network interface controller (NIC) or other type of transceiver device to transmit and receive communication via a network.

In the exemplary embodiment, the CRM 204 includes an operating system 220 which may be an operating system 114. The CRM 204 includes an unseen object amodal instance segmentation network 222 which may be an unseen object amodal instance segmentation network (UOAIS-Net) 116. The unseen object amodal instance segmentation network 222 may include one or more modules and/or API illustrated by blocks 224, 226, 228, 230, and 232, but it is merely illustrative and may include more or less modules and/or API.

The functions described with respect to blocks 224, 226, 228, 230 and 232 may be combined to be performed by less modules and/or APIs or divided and performed by more modules and/or APIs.

For example, the block 224 may indicate an input module having a logic which programs the processing unit 202 of the device 200 to transmit an input (for example, the cluttered scene image) to the unseen object amodal instance segmentation network 222 for the processing. In various exemplary embodiments, the cluttered scene image may be a synthesis data set which is the same as a photograph or a real image captured by a peripheral input device (for example, a camera device) connected to the device 200.

The block 226 may indicate an initial processing module having a logic to program the processing unit 202 to segment the unseen object instance from the input cluttered scene image.

The block 228 may indicate an RGB-D fusion backbone module having a logic for programming the program processing unit 202 to extract at least one image feature, among a color feature, a depth feature, and a color-depth fusion feature to detect a foreground object instance from the cluttered scene image. In various exemplary embodiments, the RGB-D fusion backbone module extracts a color feature and a depth feature and fuses the extracted color feature and depth feature to generate a color-depth fusion feature. The RGB-D fusion backbone module applies the color-depth fusion feature to a feature pyramid network FPN to extract a color-depth FPN feature. Further, the RGB-D fusion backbone module applies the color-depth fusion feature to a region proposal network RPN to extract an object region of interest (RoI). The color-depth fusion module integrates the color-depth FPN feature and the object region of interest to extract a region of interest color-depth FPN feature $F_{RoI}^{S}$ which is an object region of interest color-depth FPN feature and an object region of interest feature $F_{RoI}^{L}$ and provides the region of interest color-depth FPN feature to the hierarchical occlusion model.

The block 230 may indicate a hierarchical occlusion module having a logic which programs the processing unit 202 to hierarchically perform at least two of a bounding box, a visible mask, an amodal mask, an invisible mask, and occlusion inference for an arbitrary object instance, based on at least one image feature of a color feature, a depth feature, a color-depth fusion feature, a region of interest color-depth FPN feature $F_{RoI}^{S}$, and an object region of interest feature $F_{RoI}^{L}$ provided from the RGB-D fusion backbone module. The hierarchical occlusion module is designed to infer a bounding box of the object region of interest from the cluttered scene image first, infer the visible mask based on the inferred bounding box, infer the amodal mask (or invisible mask) based on the inferred bounding box and visible mask, and infer the occlusion based on the inferred bounding box, visible mask, and amodal mask (or invisible mask).

The block 232 may indicate a machine learning module having a logic which programs the processing unit 202 to extract a model parameter of an unseen object amodal instance segmentation network based on a plurality of training images and the occlusion corresponding to the training image. The training image may be a composite data set including a plurality of objects with various shapes and textures and each object instance included in the cluttered scene image may include annotation data on whether it is amodal (occluded). The machine learning module machine-learns the unseen object amodal instance segmentation network based on a plurality of realistic composite data and the unseen object amodal instance segmentation network may learn feature extracting and calculating processes to extract a bounding box, a visible mask, an amodal mask, an invisible mask and infer the occlusion of all object instances included in the cluttered scene image.

The training image, data of whether to be occluded corresponding to the training image, and a starting model parameter may be stored in the computer device 200 such as the data storage 212. The training image, the data of whether to be occluded corresponding to the training image, and the starting model parameter may be extracted or received from a remote computer device by means of the network interface 218 and stored in the data storage 212.

In various exemplary embodiments, the machine learning module may train the unseen object amodal instance segmentation network in a multi-stage process. In some exemplary embodiments, the machine learning module initializes the initial processing module, the RGB-D fusion backbone module, and the hierarchical occlusion module with starting model parameters. After initialization, the machine learning module trains the model parameters of the initial processing module, the RGB-D fusion backbone module, and the hierarchical occlusion module using training images.

In various exemplary embodiments, the machine learning module may train the unseen object amodal instance segmentation network in an initial set-up. According to another exemplary embodiment, the machine learning module may periodically train the unseen object amodal instance segmentation network at a designated time at every week or every month and when it is manually indicated by a program manager, trains the unseen object amodal instance segmentation network.

Alternatively, a part or all of the above-mentioned data (for example, training images and occlusion data corresponding to the training images) may be stored a separate memory 234, such as a memory 234(1) on a CPU type processing unit 206, a memory 234(2) on a GPU type processing unit 208, a memory 234(3) on a FPGA type accelerator 210(1), a memory 234(4) on a DSP type accelerator 210(2), and/or a memory 234(M) of other accelerator 210(N).

The bus 240 may be the bus 112 and includes one or more of a system bus, a data bus, an address bus, a PCI bus, a mini-PCI bus, and various arbitrary local, peripheral, and/or independent buses and operably connects the CRM 204 to the processing unit 202.

Figure 3:
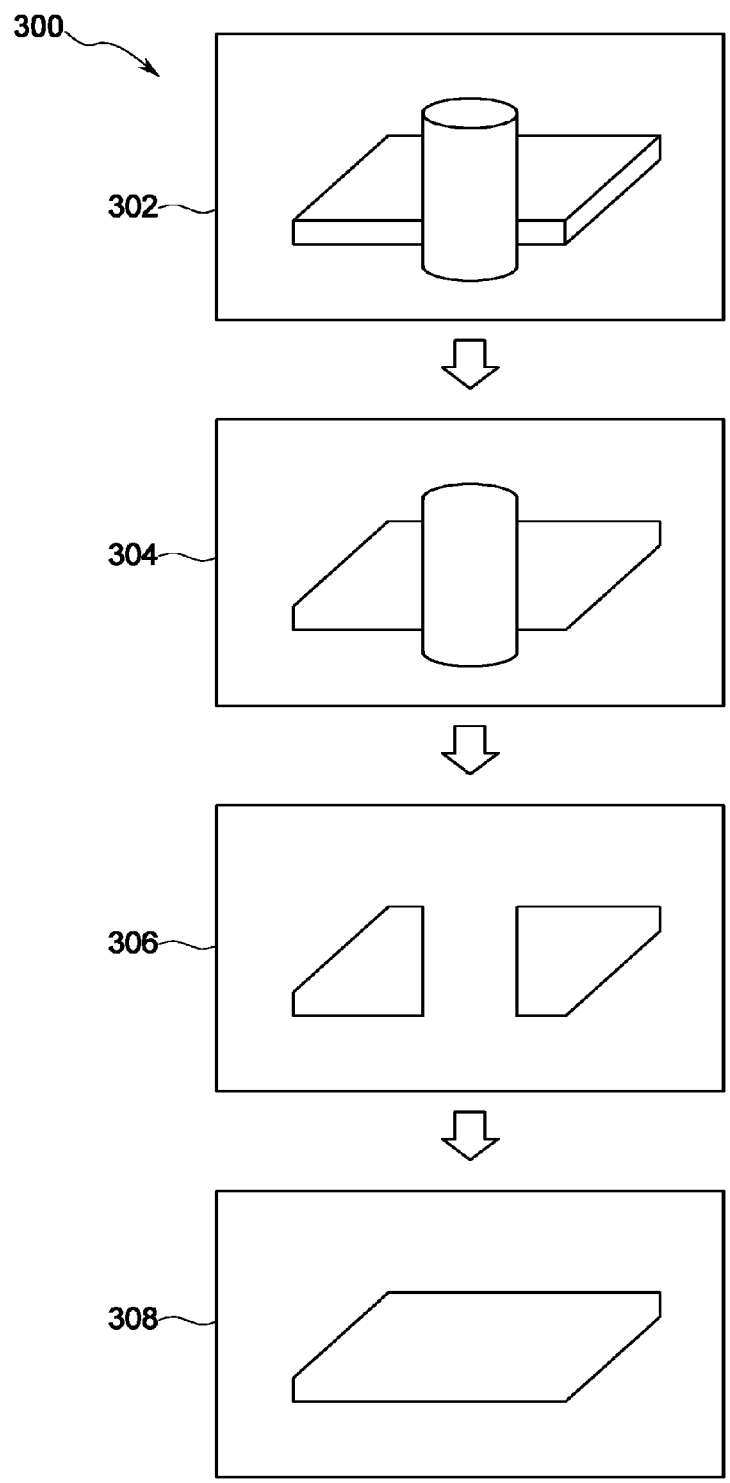
FIG. 3 is a flowchart illustrating an exemplary process of a unseen object amodal instance segmentation network with regard to FIG. 2.

FIG. 3 is a flowchart illustrating an exemplary process of the above-described unseen object amodal instance segmentation network with regard to FIG. 2. According to various exemplary embodiments, the unseen object amodal instance segmentation network may be implemented by a plurality of networks which operates together to segment an unseen object instance from the cluttered scene image and infer the occlusion.

In 302, the unseen object amodal instance segmentation network (UOAIS-Net) may receive the cluttered scene image. The cluttered scene image includes two or more object instances which are disposed to partially overlap. As illustrated in the drawing, the cluttered scene image may include a cylindrical can and a cuboidal box and the can may be disposed in front of the box. In another exemplary embodiment, the cluttered scene image include a larger number of objects and the object included in the cluttered scene image may be household objects (for example, cereal boxes or bottles) and industrial objects (for example, brackets or screws) with various materials and geometries. According to various exemplary embodiments, amodal annotations may be assigned to each object of the cluttered scene image. The object instance assigned with the amodal annotation may refer to an object instance with a region occluded by other object instance. According to another exemplary embodiment, an annotation based on a relative occlusion order may be assigned to each object instance.

In various exemplary embodiments, the unseen object amodal instance segmentation network may use color information, depth information or fusion information of the color information and the depth information to accurately derive a boundary of the object instance. To this end, the unseen object amodal instance segmentation network may extract the color feature and the depth feature using a separate ResNet50 according to each modality of the color and the depth. Thereafter, the color feature and the depth feature are connected and 1*1 convoluted to be fused as a color-depth fusion feature at multiple levels.

In various exemplary embodiments, the color-depth fusion feature is provided to the feature pyramid network FPN to extract the color-depth FPN feature and is provided to the region proposal network RPN to extract an object region of interest. The extracted color-depth FPN feature and object region of interest are provided to a region of interest align layer to derive the region of interest color-depth FPN feature $F_{RoI}^S$ and the object region of interest feature $F_{RoI}^L$.

In 304, the bounding box may be derived from the region of interest color-depth FPN feature $F_{RoI}^S$ and the object region of interest feature $F_{RoI}^L$. In various exemplary embodiments, UOAIS-Net derives the foreground region for the derived object region of interest to assign a class and a bounding box having a closed curve may be generated between a boundary between the foreground object instance and the background and a boundary between one object instance and the other object instance. In another example, the bounding box may be formed to be rectangular, circular, hexagonal.

In 306, the visible mask may be segmented from the bounding box feature. In various exemplary embodiments, the UOAIS-Net extracts a visible area of the bounding box in which a surface of the object instance is visible as a visible mask and derives a visible feature of the visible mask. In various exemplary embodiments, the UOAIS-Net includes a hierarchical fusion model including a convolution layer with a bounding box feature as an input and a visible mask based on the bounding box feature may be segmented thereby.

In 308, the amodal mask may be segmented from the bounding box feature and the visible feature. In various exemplary embodiments, the UOAIS-Net infers the invisible area in which the surface is not visible (occluded by another object) based on the visible area in which a surface of the object instance is visible, extracts an amodal mask in which the visible area and the invisible area are integrated, and derives the amodal feature of the amodal mask. In another exemplary embodiment, the invisible feature of the invisible mask may be derived from the bounding box feature and the visible feature. The amodal mask and the invisible mask may be referred as an occlusion including area mask and the amodal feature and the invisible feature may be referred to as an occlusion including area feature. In various exemplary embodiments, the UOAIS-Net may include a hierarchical fusion model including a convolution layer with the bounding box feature and the visible feature as inputs or a neural network of a fully connected layer and the occlusion including area mask based on the bounding box feature and the visible feature may be segmented thereby. Here, the occlusion including region mask may be an amodal mask or an invisible mask.

The occlusion may be inferred from the bounding box feature derived from 304, the visible feature derived from 306, and the occlusion including area feature derived from 308. In various exemplary embodiments, the UOAIS-Net derives the occlusion feature indicating whether there is an area in which the object instance is occluded by the other object instance and infers the occlusion from the derived occlusion feature. In various exemplary embodiments, the UOAIS-Net may include a hierarchical fusion model including a convolution layer with the bounding box feature, the visible feature, and the occlusion including area feature as inputs or a neural network of a fully connected layer and the occlusion based on the bounding box feature, the visible feature, and the occlusion including area feature may be inferred thereby. The occlusion including area feature may include the amodal feature or the invisible feature.

FIG. 4 is a diagram illustrating a unseen object amodal instance segmentation network 400 according to an exemplary embodiment of the present disclosure.

The unseen object amodal instance segmentation network 400 may receive a cluttered scene image 402. In various exemplary embodiments, the cluttered scene image 402 may be received from the data storage 212 in the device or received from the consumer computer device 126 via the network.

The unseen object amodal instance segmentation network 400 follows a structure proposed by the mask R-CNN. In the machine learning, the convolutional neural network (CNN) is one of an artificial neural network which is successfully applied to a field of visual image analysis. The regions with CNN features (R-CNN) is a technique which detects an object using a convolutional neural network (CNN) and generates a proposal corresponding to an object region. The R-CNN technique is consistently developing.

A faster R-CNN performs two-step pipe lines with a region proposal network RPN added to the fast R-CNN. In the first step, the region proposal network (RPN) refines and organizes an anchor set to generate a sparse set of proposal boxes and in the second step, a regional CNN detector (R-CNN) refines and classifies the proposal generated by the RPN.

The mask R-CNN technique is a structure in which in the faster R-CNN, a mask dividing unit is added, the feature pyramid network (FPN) is added before the regional proposal network RPN, and a region of interest align (RoI) layer is added. That is, the unseen object amodal instance segmentation network of the present disclosure employs a FPN, an RPN, a region of interest align layer in the RGB-D fusion backbone and employs the mask dividing unit in the hierarchical occlusion module to extract each mask to utilize a structure proposed by the mask R-CNN.

The unseen object amodal instance segmentation network 400 may be configured to include an RGB-D fusion backbone 404 which receives the cluttered scene image to derive an image feature for the region of interest and the object region of interest feature, a hierarchical occlusion module 406 which sequentially extracts at least some of the bounding box feature, the bounding box, the visible feature, the visible mask, the amodal feature, the amodal mask, the invisible feature, the invisible mask, the occlusion feature, and the occlusion based on the image feature and the object region of interest feature, and an object instance segmentation unit 408 which segments the object instance based on the derived bounding box, visible mask, amodal mask, invisible mask, and occlusion.

The RGB-D fusion backbone 404 receives the cluttered scene image. The cluttered scene image includes two or more object instances in which at least partial areas are disposed to overlap. For example, as illustrated in FIG. 3, the cluttered scene image includes a rectangular box and a cylindrical can disposed in front of the box. In this case, a partial area of the box instance may be occluded by the can instance. As another example, the cluttered scene image may include a larger number of objects and one object instance may be occluded by two or more object instances. The RGB-D fusion backbone 404 derives a color feature, a depth feature, and a color-depth fusion feature from the cluttered scene image and extracts the region of interest color-depth FPN feature $F_{RoI}^{S}$ and the object region of interest feature $F_{RoI}^{L}$ corresponding to the object region of interest from the derived color feature, depth feature, and color-depth fusion feature.

The hierarchical occlusion module 406 may hierarchically and sequentially infer the class C, the bounding box B, the visible mask V, the amodal mask A, and the occlusion O for an arbitrary object instance based on the region of interest color-depth FPN feature $F_{RoI}^{S}$ and the object region of interest feature $F_{RoI}^{L}$. Here, the class C is information distinguishing whether the region of interest is a foreground or a background, the bounding box B is a closed curve extracted along the boundary of the object instance, and the visible mask V may be a region which is visible from the object instance. Further, the amodal mask A is an entire region of the object instance and refers to a region in which the visible mask and the invisible mask are combined and the invisible mask IV may be inferred instead of the amodal mask A. The occlusion O may refer to whether there is a region in which an arbitrary object instance is occluded by the other object. First, the hierarchical occlusion module 406 derives the bounding box feature and the bounding box B, extracts the visible feature and the visible mask based on the bounding box feature, extracts the amodal feature and the amodal mask based on the bounding box feature and the visible feature, and extracts the occlusion feature and the occlusion based on the bounding box feature, the visible feature, and the amodal feature.

The object instance segmentation unit 408 segments the invisible object instance based on the class C, bounding box B, visible mask V, amodal mask A, and occlusion O which are received for all foreground object instances.

FIG. 5 is a diagram illustrating an example of a RGB-D fusion backbone according to an exemplary embodiment of the present disclosure.

The RGB-D fusion backbone 404 may be configured to include a color feature extracting unit 501 extracts a color feature from the cluttered scene image 402, a depth feature extracting unit 502 which extracts a depth feature from the cluttered scene image 402, a color-depth feature fusion unit 503 which fuses the extracted color feature and the depth feature to derive a color-depth fusion feature, a feature pyramid network (FPN) 504 which extracts the color-depth FPN feature from the color feature, the depth feature, and the color-depth fusion feature, a region proposal network (RPN) 505 which extracts an object region of interest from the color feature, the depth feature, the color-depth fusion feature, and a region of interest align layer 507 which derives the region of interest color-depth FPN feature $F_{RoI}^{S}$ and the object region of interest feature $F_{RoI}^{L}$ from the color-depth FPN feature and the object region of interest.

The RGB-D fusion backbone 404 may use color information or depth information to derive the boundary of the object instance. The RGB-D fusion backbone 404 may use color information or depth information to more accurately derive the boundary of the object instance. To this end, the RGB-D fusion backbone 404 may extract the color feature and the depth feature using a separate ResNet50 according to each modality of the color and the depth. The color-depth feature fusion unit 503 connects and 1*1 convolutes the color feature and the depth feature to be fused as a color-depth fusion feature at multiple levels. The color-depth fusion feature is provided to the feature pyramid network FPN 504 to extract the color-depth FPN feature and is provided to the region proposal network RPN 505 to extract an object region of interest (RoI). The extracted color-depth FPN feature and the object region of interest are provided to a region of interest align layer 507 to derive the region of interest color-depth FPN feature $F_{RoI}^{S}$ and the object region of interest feature $F_{RoI}^{L}$.

Figure 6:
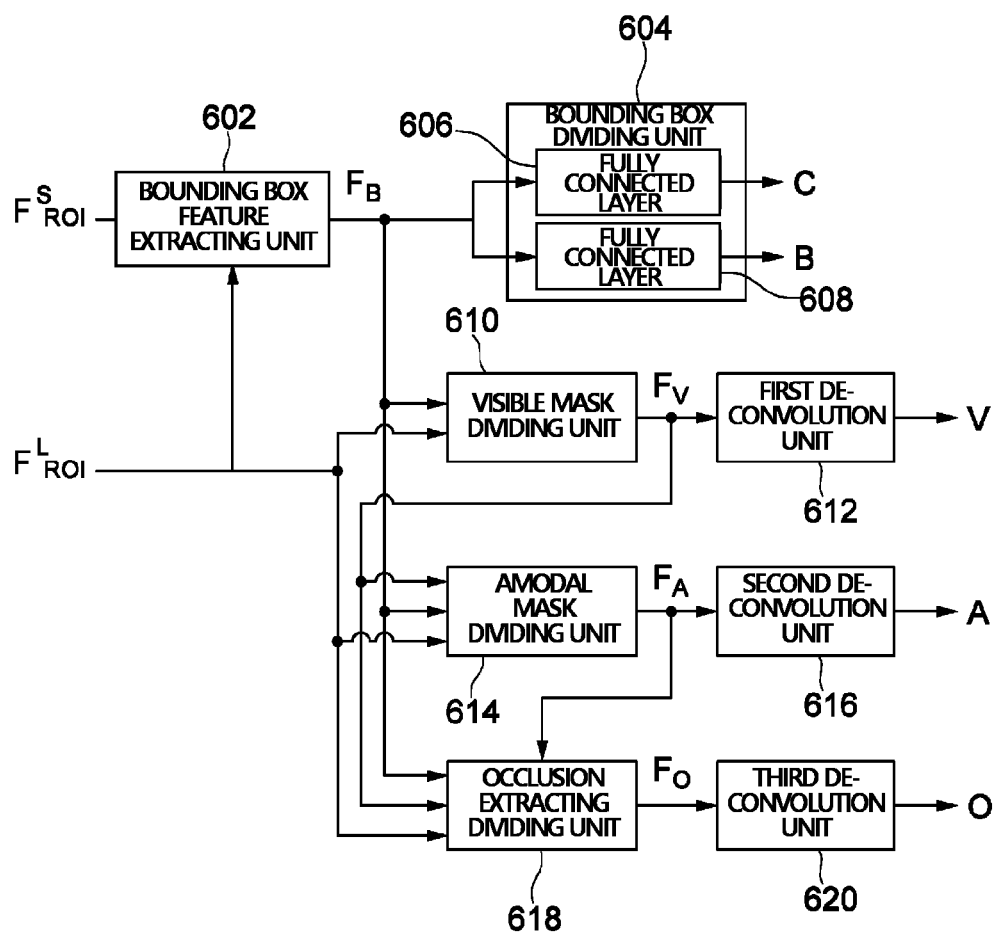
FIG. 6 is a diagram illustrating an example of a hierarchical occlusion module according to the present disclosure.

FIG. 6 is a diagram illustrating an example of a hierarchical occlusion module according to the present disclosure.

The hierarchical occlusion module may be configured to include a bounding box feature extracting unit 602 which extracts a bounding box feature $F_B$ of an object instance based on the region of interest color-depth FPN feature $F_{RoI}^{S}$ and the object region of interest feature $F_{RoI}^{L}$, a bounding box dividing unit 604 which extracts a class and a bounding box of the object instance based on the bounding box feature $F_B$, a visible mask dividing unit 610 which extracts a visible feature $F_V$ of the object instance based on the bounding box feature $F_B$, an amodal mask dividing unit 614 which extracts an amodal feature $F_A$ of the object instance based on the bounding box feature $F_B$ and the visible feature $F_V$, and an occlusion inference dividing unit which extracts an occlusion feature $F_O$ of an object instance based on the bounding box feature $F_B$, the visible feature $F_V$, and the amodal feature $F_A$. As another exemplary embodiment, instead of the amodal mask dividing unit 614, an invisible mask dividing unit which extracts an invisible feature $F_{IV}$ of the object instance based on the bounding box feature $F_B$ and the visible feature $F_V$ may be configured. In this case, the occlusion inference dividing unit may extract an occlusion feature $F_O$ of an object instance based on the bounding box feature $F_B$, the visible feature $F_V$, and the invisible feature $F_{IV}$.

The hierarchical occlusion module may be configured to include a first deconvolution unit 612 which de-convolutes the visible feature $F_V$ to extract a visible mask V of an object instance based on the visible feature, a second deconvolution unit 616 which de-convolutes the amodal feature $F_A$ to extract an amodal mask A of an object instance based on the amodal feature, and a third deconvolution unit 620 which de-convolutes the occlusion feature $F_O$ to infer the occlusion of an object instance based on the occlusion feature. As another example, a mask may be extracted from each feature by constructing a fully connected layer by replacing the first deconvolution unit 612 to the third deconvolution unit 620.

The bounding box feature extracting unit 602 may extract a bounding box feature $F_B$ of an object instance based on the region of interest color-depth FPN feature $F_{RoI}^{S}$ and the object region of interest feature $F_{RoI}^{L}$. The region of interest color-depth FPN feature $F_{RoI}^{S}$ is supplied as a 3*3 deconvolution layer and an object region of interest feature which is up-sampled with a size of 14*14 is transmitted to three 3*3 convolution layers. An output of this task may be used as the bounding box feature $F_B$.

The bounding box dividing unit 604 may extract a class and a bounding box of an arbitrary object instance based on the bounding box feature $F_B$. The bounding box dividing unit 604 may be configured by two fully connected layers 606 and 608 and the boundary box feature $F_B$ is supplied to one fully connected layer 606 to extract a class C and the boundary box feature $F_B$ is supplied to the other fully connected layer 608 to extract a bounding box B for an arbitrary object instance.

The boundary box feature $F_B$ and the object region of interest feature $F_{RoI}^{L}$ may be input to the visible mask dividing unit 610. The visible mask dividing unit 610 is configured to include a hierarchical fusion (HF) module or a fully connected layer including a convolution layer and in the hierarchical fusion module or the fully connected layer of the visible mask dividing unit 610, the boundary box feature $F_B$ and the object region of interest feature $F_{RoI}^{L}$ are fused to extract the visible feature $F_V$ to be transmitted to the amodal mask dividing unit 614 and the occlusion inference dividing unit 618. The visible feature $F_V$ is de-convoluted in the first deconvolution unit 612 or computed as the fully connected layer to extract the visible mask V.

The boundary box feature $F_B$, the object region of interest feature $F_{RoI}^{L}$, and the visible feature $F_V$ may be input to the amodal mask dividing unit 614. The amodal mask dividing unit 614 is configured to include a hierarchical fusion (HF) module or a fully connected layer including a convolution layer and in the hierarchical fusion module or the fully connected layer of the amodal mask dividing unit 614, the boundary box feature $F_B$, the object region of interest feature $F_{RoI}^{L}$, and the visible feature $F_V$ are fused to extract the amodal feature $F_A$ to be transmitted to the occlusion inference dividing unit 618. The amodal feature $F_A$ is de-convoluted in the second deconvolution unit 616 or computed as the fully connected layer to extract the amodal mask A. The amodal mask dividing unit 614 is replaced with the invisible mask dividing unit and the boundary box feature $F_B$, the object region of interest feature $F_{RoI}^{L}$, and the visible feature $F_V$ may be input to the invisible mask dividing unit. The invisible mask dividing unit is configured to include a hierarchical fusion (HF) module or a fully connected layer including a convolution layer and in the hierarchical fusion module or the fully connected layer of the invisible mask dividing unit, the boundary box feature $F_B$, the object region of interest feature $F_{RoI}^{L}$, and the visible feature $F_V$ are fused to extract the invisible feature $F_{IV}$ to be transmitted to the occlusion inference dividing unit 618. The invisible feature $F_{IV}$ is de-convoluted in the deconvolution unit or computed as a fully connected layer to extract an invisible mask IV. The amodal mask dividing unit and the invisible mask dividing unit may be referred to as an occlusion including region mask dividing unit.

The boundary box feature $F_B$, the object region of interest feature $F_{RoI}^{L}$, the visible feature $F_V$, and the amodal feature $F_A$ may be input to the occlusion inference dividing unit 618. The occlusion inference dividing unit 618 is configured to include a hierarchical fusion (HF) module or a fully connected layer including a convolution layer and in the hierarchical fusion module or the fully connected layer of the occlusion inference dividing unit 618, the boundary box feature $F_B$, the object region of interest feature $F_{RoI}^{L}$, the visible feature $F_V$, and the amodal feature $F_A$ are fused to extract the occlusion feature $F_O$. The occlusion feature $F_O$ is de-convoluted in the third deconvolution unit 620 or computed as the fully connected layer to extract the occlusion O.

Figure 7:
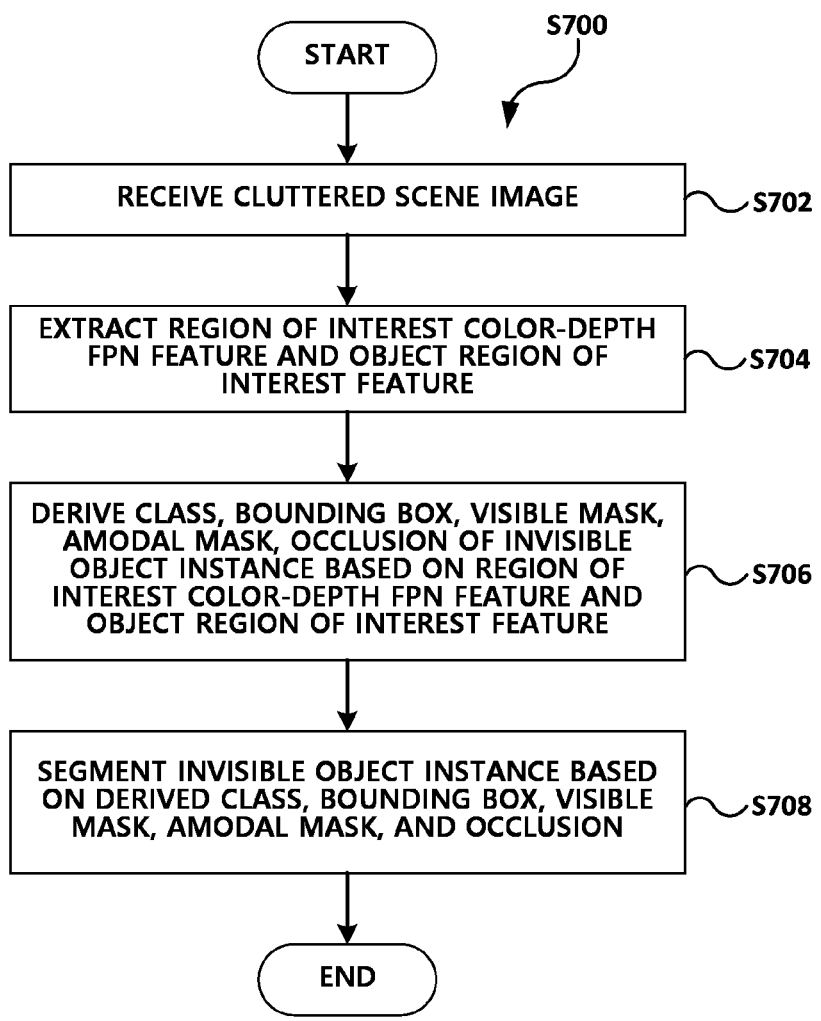
FIG. 7 is a view illustrating an exemplary flow of a unseen object instance segmentation process according to an exemplary embodiment of the present disclosure.
Figure 8:
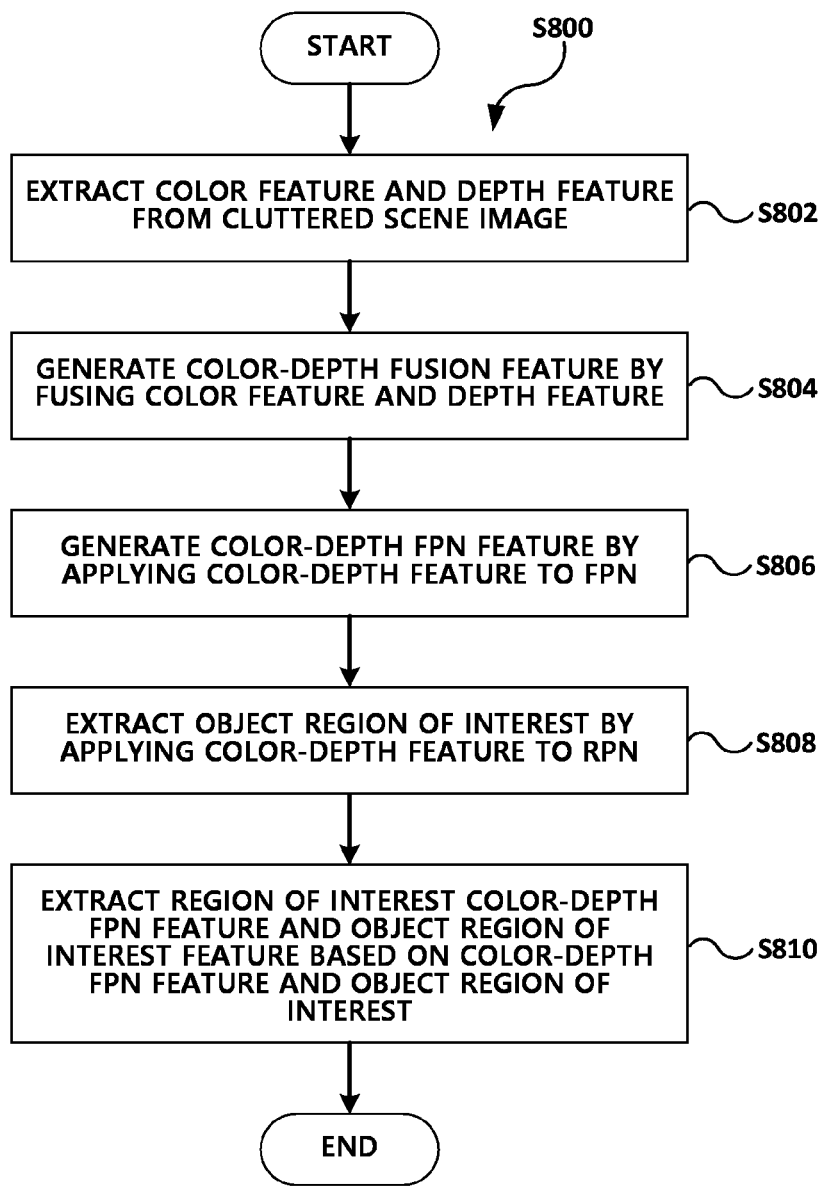
FIG. 8 is a view illustrating an exemplary flow of a color-depth fusion feature deriving process according to an exemplary embodiment of the present disclosure.
Figure 9:
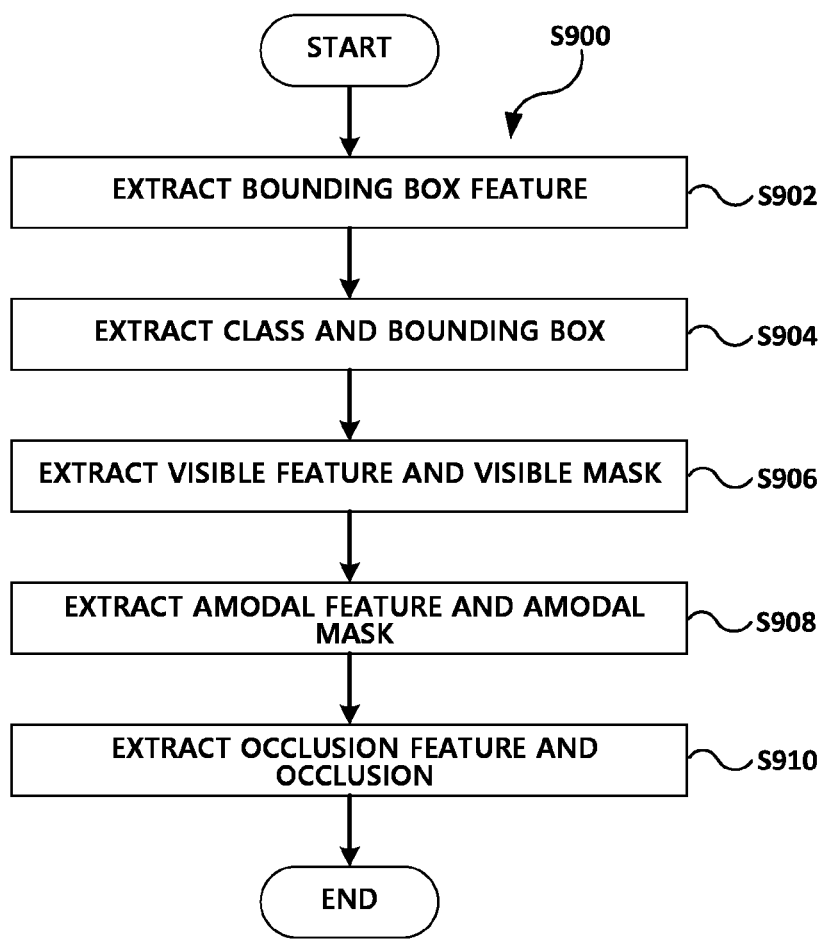
FIG. 9 is a view illustrating an exemplary flow of a hierarchal occlusion inference process according to an exemplary embodiment of the present disclosure.

FIGS. 7 to 9 are flowcharts illustrating an unseen object instance segmentation process, a color-depth fusion feature deriving process, and a hierarchical occlusion inference process according to an exemplary embodiment of the present disclosure. An operation of an exemplary process is illustrated as individual blocks and is described with reference to the blocks. The process is illustrated as a logic flow of blocks and each block may indicate one or more operations which may be implemented by hardware, software, or a combination thereof. With regard to the software, when the operation is executed by one or more processors, the operation indicates a computer executable command which is stored in one or more computer readable media which allows one or more processors to perform a recited operation. Generally, the computer executable command include routines, programs, objects, modules, components, data structures, execution of specific functions, or implementation of particular abstract data types. The order of describing the operations should not be construed as limiting, and the number of operations described may be executed in any order, subdivided into multiple sub-operations, or executed in parallel.

FIG. 7 is a view illustrating an exemplary flow of a unseen object instance segmentation process S700 according to an exemplary embodiment of the present disclosure.

In block S702, a computer system receives a cluttered scene image. In various exemplary embodiments, the cluttered scene image may be received from the consumer computer device 126 via the network 104. In some exemplary embodiments, the cluttered scene image may be received from the data storage 212 on the computer device 200. The cluttered scene image includes an invisible object instance occluded by another object instance and may be a realistic synthesis data set which is the same as the photograph or a real image captured by an actual camera.

In block S704, the computer system may extract an image feature including at least one of a color feature, a depth feature, a color-depth fusion feature, and the color-depth FPN feature $F_{RoI}^S$ for the region of interest and the object region of interest feature $F_{RoI}^L$, from the cluttered scene image including at least one invisible object instance. The computer system extracts a color feature and a depth feature to detect an invisible object instance and fuses the extracted color feature and depth feature to generate the color-depth fusion feature. The computer system employs the structure of the mask R-CNN to include the feature pyramid network FPN, the region proposal network RPN, and the region of interest align layer and thus extract the region of interest color-depth FPN feature and the object region of interest feature.

In block S706, the computer system derives the class, the bounding box, the visible mask, the amodal mask, and the occlusion of the invisible object instance, based on the region of interest color-depth FPN feature and the object region of interest feature extracted in block S704. The computer system derives a bounding box first, extracts a visible mask based on the bounding box feature, and extracts an amodal mask or an invisible mask based on the bounding box feature and the visible feature. Thereafter, the computer system infers the occlusion based on the bounding box feature, the visible feature, and the amodal feature (or invisible feature). As described above, the computer system sequentially and hierarchically may perform at least two of the bounding box, the visible mask, the amodal mask (or invisible mask) and occlusion inference.

In block S708, the computer system segments the invisible object instance based on the class, the bounding box, the visible mask, the amodal mask (or invisible mask) and the occlusion derived in block S706.

FIG. 8 is a view illustrating an exemplary flow of a color-depth fusion feature deriving process S800 according to an exemplary embodiment of the present disclosure. The color-depth fusion feature deriving process may be performed in the RGB-D fusion backbone and may be substantially the same as block S704. The present disclosure basically follows a mask R-CNN structure in which in the faster R-CNN, a mask dividing unit is added, the feature pyramid network (FPN) is added before the regional proposal network RPN, and a region of interest align (RoI) layer is added. However, in the present disclosure, the color feature and the depth feature are extracted from the cluttered scene image and the color-depth fusion feature in which the extracted color feature and depth feature are fused is applied to the mask R-CNN structure to derive a feature for segmenting the invisible object instance.

In block S802, the computer system extracts a color feature and a depth feature from the cluttered scene image. In order to accurately derive a boundary of the invisible object instance, the computer system commonly uses color information and depth information and to this end, extracts the color feature and the depth feature using a separate ResNet50 according to each modality for each of the color and the depth.

In block S804, the computer system fuses the extracted color feature and depth feature to generate a color-depth fusion feature. The computer system connects and 1*1 convolutes the color feature and the depth feature to fuse the color feature and the depth feature at multiple levels to be derived as a color-depth fusion feature.

In block S806, the computer system applies the color-depth feature to the feature pyramid network FPN to generate a color-depth FPN feature.

In block S808, the computer system applies the color-depth feature to the region proposal network RPN to extract an object region of interest.

In block S810, the computer system applies the color-depth FPN feature and the object region of interest to a region of interest align layer to extract the region of interest color-depth FPN feature $F_{RoI}^S$ and the object region of interest feature $F_{RoI}^L$.

FIG. 9 is a view illustrating an exemplary flow of a hierarchal occlusion inference process S900 according to an exemplary embodiment of the present disclosure. The hierarchal occlusion inference process may be performed in the hierarchal occlusion module and is substantially the same as the block S706.

In block S902, the computer system may extract a bounding box feature $F_B$ based on the region of interest color-depth FPN feature $F_{RoI}^S$ and the object region of interest feature $F_{RoI}^L$. The region of interest color-depth FPN feature $F_{RoI}^S$ is supplied to a 3*3 deconvolution layer and an object region of interest feature which is up-sampled with a size of 14*14 is transmitted to three 3*3 convolution layers, and the output of this task may be used as the bounding box feature $F_B$.

In block S904, the computer system extracts a class C and a bounding box B of an invisible object instance based on the bounding box feature $F_B$. The bounding box feature $F_B$ is supplied to one fully connected layer 606 to extract the class C and the bounding box feature $F_B$ is supplied to another fully connected layer 608 to extract a bounding box B for an arbitrary object instance.

In block S906, the computer system extracts a visible feature $F_V$ and the visible mask V of the invisible object instance based on the object region of interest feature $F_{RoI}^L$ and the bounding box feature $F_B$. The bounding box feature $F_B$ and the object region of interest feature $F_{RoI}^L$ are fused in the hierarchical fusion (HF) module or the fully connected layer including a convolution layer to extract a visible feature $F_V$ and the visible feature $F_V$ is de-convoluted or is computed in the fully connected layer to extract the visible mask V.

In block S908, the computer system extracts an amodal feature $F_A$ and the amodal mask A of the invisible object instance based on the object region of interest feature $F_{RoI}^L$, the bounding box feature $F_B$, and the visible feature $F_V$. The bounding box feature $F_B$, the object region of interest feature $F_{RoI}^L$, and the visible feature $F_V$ are fused in the hierarchical fusion (HF) module or the fully connected layer including a convolution layer to extract an amodal feature $F_A$ and the amodal feature $F_A$ is de-convoluted or is computed in the fully connected layer to extract the amodal mask A. As another exemplary embodiment, in block S908, instead of the amodal feature and the amodal mask A, the invisible feature and the invisible mask IV may be extracted.

In block S910, the computer system extracts an occlusion feature $F_O$ and the occlusion O of the invisible object instance based on the object region of interest feature $F_{RoI}^L$, the bounding box feature $F_B$, the visible feature $F_V$, and the amodal feature $F_A$ (or the invisible feature). The bounding box feature $F_B$, the object region of interest feature $F_{RoI}^L$, the visible feature $F_V$, and the amodal feature $F_A$ (or the invisible feature) are fused in the hierarchical fusion (HF) module or the fully connected layer including a convolution layer to extract an occlusion feature $F_O$ and the occlusion feature $F_O$ is de-convoluted or is computed in the fully connected layer to extract the occlusion O.

All the above-described methods and processes may be implemented by a software code module executed by one or more general purpose computers or processors and fully automated. The code module may be stored in an arbitrary type of computer readable storage medium or other computer storage device. Some or all methods may be implemented by a special computer hardware.

It should be understood that any routine description, element or block of the flowcharts described herein and/or illustrated in the accompanying drawings potentially represents a code, a module, a segment or a portion including one or more executable instructions for implementing a particular logical function or element. Routines and alternative examples are included within the scope of the examples described herein, and may be executed substantially synchronously or in reverse order, with elements or functions deleted or sequenced from what is shown or discussed, depending on the functionality to be understood herein.

It should be understood that many variations and modifications may be made to the above-described embodiments, and the element thereof is one of other permissible examples. All the modifications and variations are intended to be included in the scope of the present disclosure and protected by the following claims. The exemplary embodiment of the present disclosure described above may be implemented in the form of a program command which may be executed through various computer components to be recorded in a computer readable recording medium. The computer readable recording medium may include solely a program command, a data file, and a data structure or a combination thereof. The program commands recorded in the computer readable recording medium may be specifically designed or constructed for the present disclosure or known to those skilled in the art of a computer software to be used. Examples of the computer readable recording medium include magnetic media such as a hard disk, a floppy disk, or a magnetic tape, optical recording media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter. The hardware device may operate as one or more software modules in order to perform the operation of the present disclosure and vice versa.

The specified matters and limited exemplary embodiments and drawings such as specific elements in the present disclosure have been disclosed for broader understanding of the present disclosure, but the present disclosure is not limited to the exemplary embodiments, and various modifications, additions and substitutions are possible from the disclosure by those skilled in the art.

The spirit of the present disclosure is defined by the appended claims rather than by the description preceding them, and all changes and modifications that fall within metes and bounds of the claims, or equivalents of such metes and bounds are therefore intended to be embraced by the range of the spirit of the present disclosure.

What is claimed is:

1. A hierarchical occlusion inference method performed by at least one processor of a computer system, comprising:
    acquiring an image feature and an object region of interest feature derived from a cluttered scene image including at least one object instance, by the computer system;
    deriving a bounding box feature of the object instance from the image feature and the object region of interest feature, by the computer system;
    deriving a visible feature of the object instance by fusing the object region of interest feature and the bounding box feature, by the computer system;
    deriving an occlusion including region feature of the object instance by fusing the object region of interest feature and the visible feature, by the computer system; and
    deriving an occlusion including region mask of the object instance from the occlusion including region feature, by the computer system,
    wherein the deriving of a bounding box feature of the object instance from the image feature and the object region of interest feature, by the computer system, includes:
        deriving the bounding box feature of the object instance based on a region of interest color-depth feature pyramid network (FPN) feature and the object region of interest feature derived from the cluttered scene image including at least one object instance, by the computer system.

2. The hierarchical occlusion inference method according to claim 1, wherein the deriving of an occlusion including region feature of the object instance by fusing the object region of interest feature and the visible feature, by the computer system, includes:
    fusing the object region of interest feature and the visible feature in a hierarchical fusion module or a fully connected layer including a convolution layer, by the computer system.

3. The hierarchical occlusion inference method according to claim 1, wherein the deriving of an occlusion including region mask of the object instance from the occlusion including region feature, by the computer system, includes:
    extracting the occlusion including region mask of the object instance by deconvoluting or computing the occlusion including region feature of the object instance in a fully connected layer, by the computer system.

4. The hierarchical occlusion inference method according to claim 1, wherein the deriving of a visible feature of the object instance by fusing the object region of interest feature and the bounding box feature, by the computer system, includes:
    fusing the object region of interest feature and the bounding box feature in a hierarchical fusion module or a fully connected layer including a convolution layer, by the computer system.

5. A hierarchical occlusion inference method performed by at least one processor of a computer system, comprising:

acquiring an image feature and an object region of interest feature derived from a cluttered scene image including at least one object instance, by the computer system;

deriving a bounding box feature of the object instance from the image feature and the object region of interest feature, by the computer system;

deriving a visible feature and an occlusion including region feature of the object instance by fusing the image feature and the bounding box feature, by the computer system;

deriving an occlusion feature of the object instance by fusing the object region of interest feature, the visible feature, and the occlusion including region feature, by the computer system; and inferring occlusion of the object instance from the occlusion feature of the object instance, by the computer system, wherein the deriving of a bounding box feature of the object instance from the image feature and the object region of interest feature, by the computer system, includes:

deriving the bounding box feature of the object instance based on a region of interest color-depth feature pyramid network (FPN) feature and the object region of interest feature derived from the cluttered scene image including at least one object instance, by the computer system.

6. The hierarchical occlusion inference method according to claim 5, wherein the deriving of an occlusion feature of the object instance by fusing the object region of interest feature, the visible feature, and the occlusion including region feature, by the computer system, includes:

fusing the object region of interest feature, the visible feature, and the occlusion including region feature in a hierarchical fusion module or a fully connected layer including a convolution layer, by the computer system.

7. The hierarchical occlusion inference method according to claim 5, wherein the inferring of occlusion of the object instance from the occlusion feature of the object instance, by the computer system, includes:

inferring the occlusion of the object instance by deconvoluting or computing the occlusion feature of the object instance in a fully connected layer, by the computer system.

8. The hierarchical occlusion inference method according to claim 5, wherein the image feature includes at least one of a color feature, a depth feature, and a color-depth fusion feature.

9. The hierarchical occlusion inference method according to claim 5, wherein the occlusion including region feature includes at least one of an amodal feature and an invisible feature.

10. The hierarchical occlusion inference method according to claim 5, further comprising:

extracting a class and a bounding box of the object instance based on the bounding box feature of the object instance, by the computer system.

11. The hierarchical occlusion inference method according to claim 10, wherein the extracting of a class and a bounding box of the object instance based on the bounding box feature of the object instance, by the computer system, includes:

extracting the class and the bounding box by supplying the bounding box feature to a fully connected layer, by the computer system.

12. The hierarchical occlusion inference method according to claim 5, further comprising:

extracting a visible mask of the object instance from the visible feature of the object instance, by the computer system.

13. The hierarchical occlusion inference method according to claim 12, wherein the extracting of a visible mask of the object instance from the visible feature of the object instance, by the computer system, includes:

extracting the visible mask of the object instance by deconvoluting or computing the visible feature of the object instance in a fully connected layer, by the computer system.

14. An unseen object amodal instance segmentation system, comprising:

a processor; and a computer readable medium including a command which allows the processor to execute an unseen object amodal instance segmentation network, wherein the unseen object amodal instance segmentation network derives and fuses a color feature and a depth feature by receiving a cluttered scene image including at least one invisible object instance to generate a color-depth fusion feature, extracts a color-depth FPN feature by applying the color-depth fusion feature to a feature pyramid network and extracting an object region of interest by applying the color-depth fusion feature to a region proposal network, extracts a region of interest color-depth FPN feature and an object region of interest feature from the color-depth FPN feature and the object region of interest feature, derives a bounding box feature and a bounding box of the invisible object instance from the region of interest color-depth FPN feature and an object region of interest feature, derives a visible feature and a visible mask of the invisible object instance by fusing the object region of interest feature and the bounding box feature, derives an amodal feature and an amodal mask of the invisible object instance by fusing the object region of interest feature, the bounding box feature, and the visible feature, derives an occlusion feature and occlusion of the invisible object instance by fusing the object region of interest feature, the bounding box feature, the visible feature, and the amodal feature, and segments the invisible object instance based on the bounding box, the visible mask, the amodal mask, and occlusion of the invisible object instance.

15. The unseen object amodal instance segmentation system according to claim 14, wherein the unseen object amodal instance segmentation network extracts the bounding box of the invisible object instance by supplying the bounding box feature to a fully connected layer.

16. The unseen object amodal instance segmentation system according to claim 14, wherein the unseen object amodal instance segmentation network derives the visible feature of the invisible object instance by fusing the object region of interest feature and the bounding box feature in a hierarchical fusion module including a convolution layer, and extracts the visible mask of the invisible object instance by deconvoluting a visible feature of the invisible object instance.

17. The unseen object amodal instance segmentation system according to claim 14, wherein the unseen object amodal instance segmentation network derives the amodal feature of the invisible object instance by fusing the object region of interest feature, the bounding box feature, and the visible feature in a hierarchical fusion module including a convolution layer, and extracts the amodal mask of the invisible object instance by deconvoluting an amodal feature of the invisible object instance.

18. The unseen object amodal instance segmentation system according to claim 14, wherein the unseen object amodal instance segmentation network derives the occlusion feature of the invisible object instance by fusing the object region of interest feature, the bounding box feature, the visible feature, and the amodal feature in the hierarchical fusion module including the convolution layer and infers the occlusion of the invisible object instance by deconvoluting an occlusion feature of the invisible object instance.

19. The unseen object amodal instance segmentation system according to claim 14, further comprising:
   a machine learning module which trains at least one model parameter of the unseen object amodal instance segmentation network to segment the invisible object instance from at least one cluttered scene image.

* * * * *